(12) United States Patent
Fischer et al.

(10) Patent No.: US 10,265,856 B2
(45) Date of Patent: Apr. 23, 2019

(54) REORIENTING A DISTANCE SENSOR USING AN ADJUSTABLE LEVELER

(71) Applicant: X Development LLC, Mountain View, CA (US)

(72) Inventors: Mark Fischer, Mountain View, CA (US); Robert Holmberg, Mountain View, CA (US)

(73) Assignee: X Development LLC, Mountain View, CA (US)

(*) Notice: Subject to any disclaimer, the term of this patent is extended or adjusted under 35 U.S.C. 154(b) by 181 days.

(21) Appl. No.: 15/216,145

(22) Filed: Jul. 21, 2016

(65) Prior Publication Data

US 2018/0021954 A1    Jan. 25, 2018

(51) Int. Cl.
*G05B 19/04* (2006.01)
*B25J 9/16* (2006.01)
(Continued)

(52) U.S. Cl.
CPC .............. *B25J 9/1692* (2013.01); *B25J 5/00* (2013.01); *B25J 13/089* (2013.01); *B25J 19/02* (2013.01);
(Continued)

(58) Field of Classification Search
CPC ....... B25J 13/089; B25J 9/1692; G05D 1/024; G05D 2201/0216; Y10S 901/01
See application file for complete search history.

(56) References Cited

U.S. PATENT DOCUMENTS

| 4,718,023 A * | 1/1988 | Arora | B25J 9/1692 700/258 |
| 8,442,790 B2 * | 5/2013 | Fukuba | G01D 18/004 702/85 |

(Continued)

FOREIGN PATENT DOCUMENTS

| DE | 102004030144 B4 | 9/2007 |
| JP | 2010122904 A | 6/2010 |

(Continued)

OTHER PUBLICATIONS

International Search Report and Written Opinion for corresponding PCT application No. PCT/US2017/043214, dated Oct. 17, 2017.

*Primary Examiner* — Khoi H Tran
*Assistant Examiner* — Jorge O Peche
(74) *Attorney, Agent, or Firm* — McDonnel Boehnen Hulbert & Berghoff LLP

(57) ABSTRACT

Example implementations may relate to a mobile robotic device that is operable to reorient a distance sensor using an adjustable leveler. According to these implementations, the robotic device may determine a height map indicating surface elevation data for a ground surface on which the robotic device is travelling within an environment. Then, the robotic device may determine a current location of the robotic device relative to the height map. Based on the current location, the robotic device may determine a current spatial orientation of the distance sensor relative to the ground surface. Further, the robotic device may (i) determine an adjusted position of the leveler to which the leveler is movable to cause the distance sensor to spatially reorient from the current spatial orientation to a target spatial orientation and (ii) cause the distance sensor to reorient to the target spatial orientation by moving the leveler to the adjusted position.

20 Claims, 16 Drawing Sheets

(51) Int. Cl.
  *B25J 13/08* (2006.01)
  *G05D 1/02* (2006.01)
  *B25J 5/00* (2006.01)
  *B25J 19/02* (2006.01)
  *G01S 7/48* (2006.01)

(52) U.S. Cl.
  CPC ........... G05D 1/024 (2013.01); G05D 1/0274 (2013.01); *G01S 7/4808* (2013.01); *G05D 2201/0216* (2013.01); *Y10S 901/01* (2013.01)

(56) References Cited

U.S. PATENT DOCUMENTS

| | | | | |
|---|---|---|---|---|
| 2010/0114416 A1* | 5/2010 | Au | ................. | G01C 21/165 701/23 |
| 2011/0043515 A1* | 2/2011 | Stathis | ................. | G01C 15/002 345/419 |
| 2014/0062762 A1* | 3/2014 | Kurono | ................. | G01S 7/354 342/146 |
| 2015/0253774 A1* | 9/2015 | Takaoka | ................. | G05D 1/0088 701/23 |
| 2015/0361642 A1* | 12/2015 | Stratton | ................. | G05D 1/0274 701/461 |
| 2015/0362921 A1* | 12/2015 | Hanaoka | ................. | G01B 11/24 701/23 |
| 2016/0129592 A1* | 5/2016 | Saboo | ................. | G06Q 50/28 700/248 |
| 2016/0170412 A1* | 6/2016 | Yamamoto | ................. | G05D 1/024 701/23 |
| 2017/0212215 A1* | 7/2017 | Hellinger | ................. | G01S 7/4026 |
| 2018/0005035 A1* | 1/2018 | Bogolea | ................. | B25J 9/1664 |

FOREIGN PATENT DOCUMENTS

| | | |
|---|---|---|
| KR | 1020100088946 A | 8/2010 |
| KR | 1020150047215 A | 5/2015 |
| WO | 2011146259 A2 | 11/2011 |

* cited by examiner

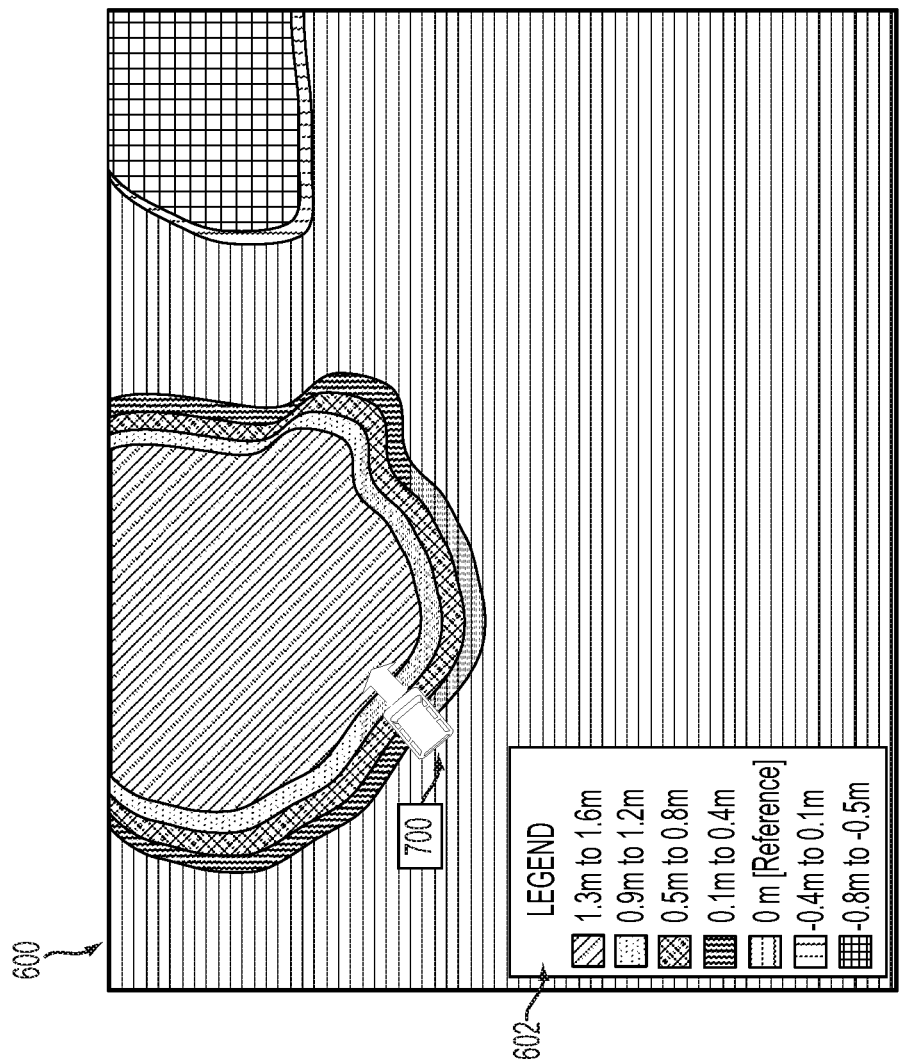

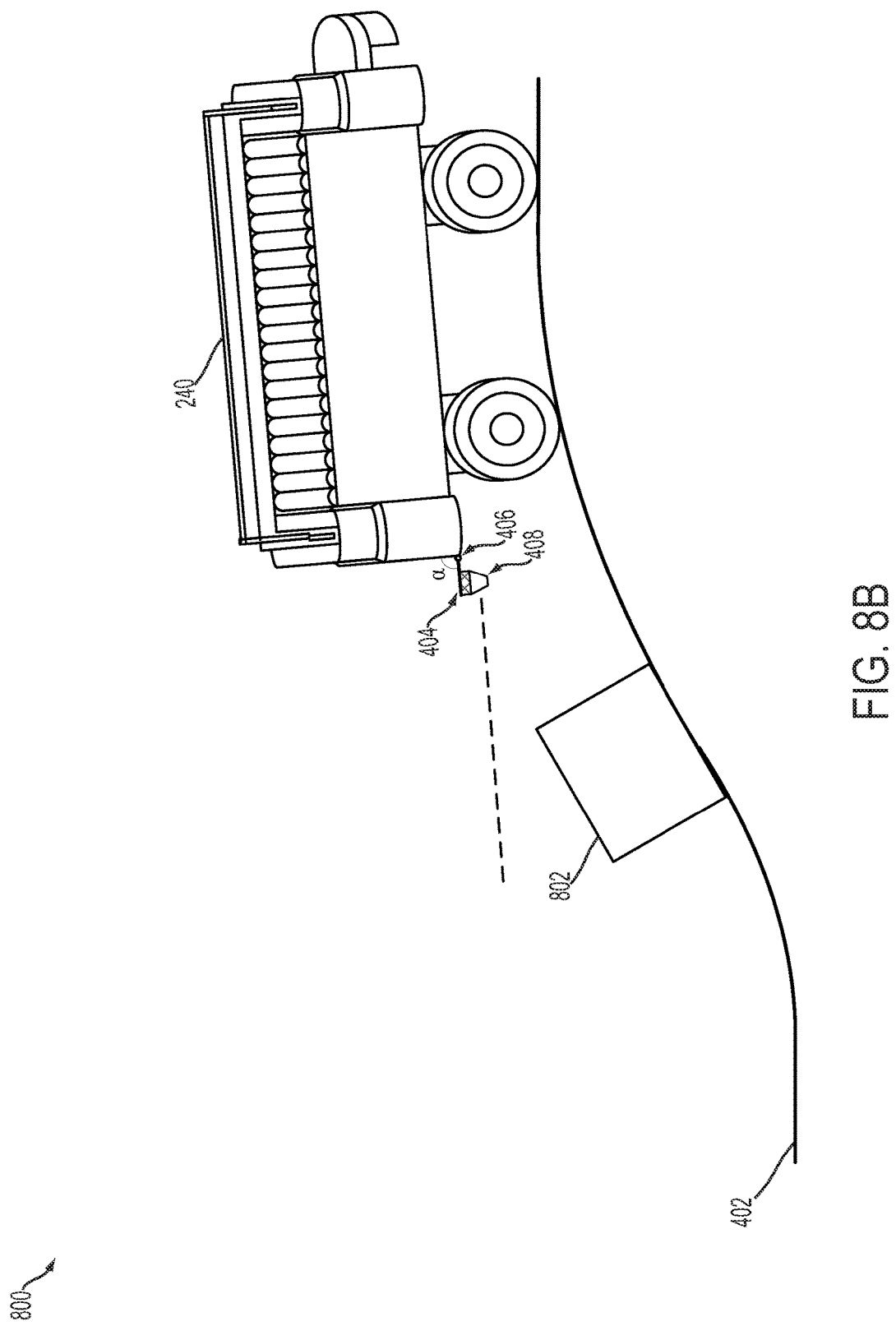

REORIENTING A DISTANCE SENSOR USING AN ADJUSTABLE LEVELER

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

According to an example implementation, a mobile robotic device may include a distance sensor coupled to an adjustable leveler. Moreover, the mobile robotic device may be configured to adjust position of the adjustable leveler so as to spatially reorient the distance sensor. With this arrangement, the mobile robotic device may spatially reorient the distance sensor based on varying elevation of the ground surface on which the mobile robotic device is currently traveling. For instance, the mobile robotic device may use the leveler to keep the distance sensor orientated at a target spatial orientation relative to the ground surface, which may be an orientation that allows the distance sensor to emit emissions that are substantially parallel to the ground surface.

In one aspect, a method is provided. The method involves determining, by a mobile robotic device, a height map indicating surface elevation data for a ground surface on which the mobile robotic device is travelling within an environment, where the mobile robotic device including a distance sensor and a leveler configured to spatially reorient the distance sensor relative to the ground surface. The method also involves determining, by the mobile robotic device, a current location of the mobile robotic device within the environment relative to the height map. The method additionally involves determining, by the mobile robotic device, a current spatial orientation of the distance sensor relative to the ground surface, based on the determined current location of the mobile robotic device within the environment relative to the height map. The method further involves determining, by the mobile robotic device, an adjusted position of the leveler to which the leveler is movable to cause the distance sensor to spatially reorient from the current spatial orientation to a target spatial orientation. The method yet further involves causing, by the mobile robotic device, the distance sensor to spatially reorient from the current spatial orientation to the target spatial orientation by moving the leveler to the determined adjusted position.

In another aspect, a mobile robotic device is provided. The mobile robotic device include a distance sensor, a leveler configured to spatially reorient the distance sensor relative to the ground surface, one or more processors, a non-transitory computer readable medium, and program instructions stored on the non-transitory computer readable medium and executable by the one or more processors to perform functions. In particular, the program instructions may be executable to determine a height map indicating surface elevation data for a ground surface on which the mobile robotic device is travelling within an environment. Also, the program instructions may be executable to determine a current location of the mobile robotic device within the environment relative to the height map. Additionally, the program instructions may be executable to determine a current spatial orientation of the distance sensor relative to the ground surface, based on the determined current location of the mobile robotic device within the environment relative to the height map. Further, the program instructions may be executable to determine an adjusted position of the leveler to which the leveler is movable to cause the distance sensor to spatially reorient from the current spatial orientation to a target spatial orientation. Yet further, the program instructions may be executable to cause the distance sensor to spatially reorient from the current spatial orientation to the target spatial orientation by moving the leveler to the determined adjusted position.

In yet another aspect, a non-transitory computer readable medium is provided. The non-transitory computer readable medium has stored therein instructions executable by one or more processors to cause a mobile robotic device to perform functions. In particular, the functions involve determining a height map indicating surface elevation data for a ground surface on which the mobile robotic device is travelling within an environment, where the mobile robotic device comprises a distance sensor and a leveler configured to spatially reorient the distance sensor relative to the ground surface. Also, the functions involve determining a current location of the mobile robotic device within the environment relative to the height map. Additionally, the functions involve determining a current spatial orientation of the distance sensor relative to the ground surface, based on the determined current location of the mobile robotic device within the environment relative to the height map. Further, the functions involve determining an adjusted position of the leveler to which the leveler is movable to cause the distance sensor to spatially reorient from the current spatial orientation to a target spatial orientation. Yet further, the functions involve causing the distance sensor to spatially reorient from the current spatial orientation to the target spatial orientation by moving the leveler to the determined adjusted position.

In yet another aspect, a system is provided. The system may include means for determining a height map indicating surface elevation data for a ground surface on which a mobile robotic device is travelling within an environment, where the mobile robotic device includes a distance sensor and a leveler configured to spatially reorient the distance sensor relative to the ground surface. The system may also include means for determining a current location of the mobile robotic device within the environment relative to the height map. The system may additionally include means for determining a current spatial orientation of the distance sensor relative to the ground surface, based on the determined current location of the mobile robotic device within the environment relative to the height map. The system may further include means for determining an adjusted position of the leveler to which the leveler is movable to cause the distance sensor to spatially reorient from the current spatial orientation to a target spatial orientation. The system may yet further include means for causing the distance sensor to spatially reorient from the current spatial position to the target spatial orientation by moving the leveler to the determined adjusted position.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 7A to 7C collectively illustrate a first scenario for reorienting a distance sensor, according to an example implementation.

FIGS. 8A to 8C collectively illustrate a second scenario for reorienting a distance sensor, according to an example implementation.

DETAILED DESCRIPTION

Figure 1A:
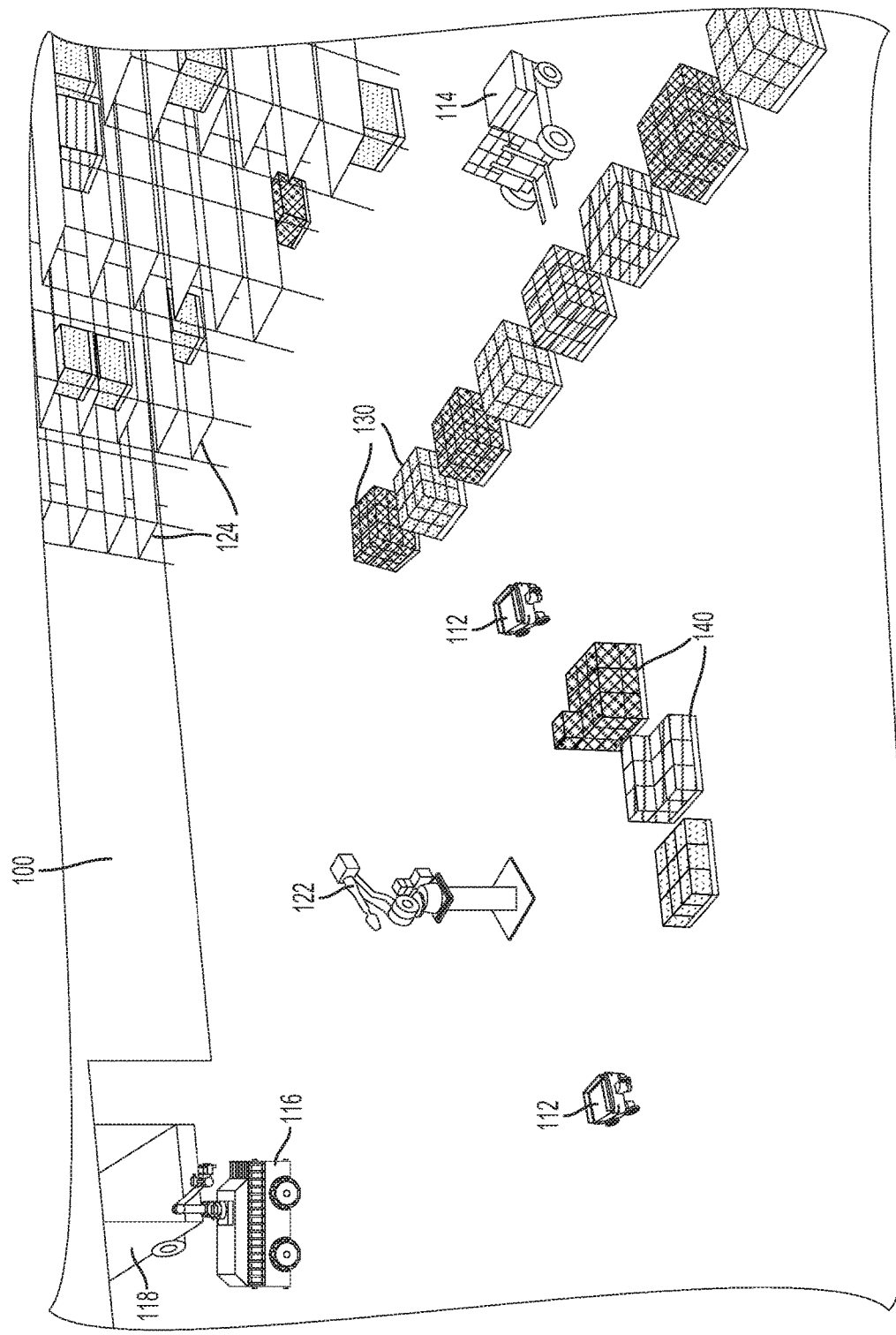
FIG. 1A shows a robotic fleet, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example implementations may relate to methods and systems for maintaining a desired orientation of a distance sensor of a mobile robotic device, such as of a laser sensor configured to collect two-dimensional (2D) planar distance measurements. In particular, a mobile robotic device may generally travel on a ground surface within an environment and, while doing so, may use the distance sensor to collect distance measurements that indicate respective distances between the distance sensor and various points in the environment. In practice, the mobile robotic device may use such distance measurements for the purpose of obstacle detection and/or object recognition, among other possibilities. Moreover, when collecting distance measurements, the distance sensor would ideally emit sensor emissions that are substantially parallel to the ground surface.

In some situations, however, the distance sensor may be unable to emit sensor emissions that are substantially parallel to the ground surface, and these situations could arise for various reasons. For instance, a mobile robotic device may continuously operate within a given space that may have floors which are not level, such as a warehouse, and a distance sensor may be situated in a fixed position on that mobile robotic device. With this arrangement, as elevation of the ground surface changes while the mobile robotic device travels on the ground surface, the distance sensor may sometimes end up orientated such that sensor emissions are emitted towards the ground surface and/or substantially away from the ground surface (e.g., towards a ceiling). Consequently, these situations may lead to false detection of objects within the environment and/or missed detections of objects within the environment, among other outcomes.

Moreover, the distance sensor may sometimes be positioned on the mobile robotic device relatively close to the ground surface, so that the distance sensor can detect objects with a small height. And in such cases, as elevation of the ground surface changes while the mobile robotic device travels on the ground surface, the distance sensor may sometimes end up orientated in a manner that decreases the distance being scanned. In practice, this may lead to various issues in addition to or alternatively to the above-mentioned false and/or missed detections. For instance, the distance sensor may sometimes be unable to detect objects at a distance beyond the mobile robotic device's minimum stopping distance for a given speed. Thus, the mobile robotic device may end up having to reduce the mobile robotic device's speed of travel so as to ensure the mobile robotic device retains the ability to stop or maneuver around a detected obstacle without colliding. As such, disclosed herein are methods and systems to help avoid or at least reduce such false and/or missed detections, and perhaps to also help optimize range of distance measurements.

In accordance with the disclosure, the mobile robotic device may have an adjustable leveler that is movable to spatially reorient the distance sensor. In practice, the leveler could take the form of any feasible mechanical feature, such as a leveling plate. Also, the leveler could be coupled to an actuator of the mobile robotic device and is thus movable based on forces that the mobile robotic device directs the actuator to apply to the leveler. In this way, the leveler is movable through various positions, such as through various angular positions relative to a portion (e.g., chassis) of the mobile robotic device. With these arrangements, the mobile robotic device could use various approaches to reorient the distance sensor relative to the ground surface and do so from time-to-time (e.g., continuously or periodically).

More specifically, the mobile robotic device may determine a height map indicating surface elevation data for the ground surface at issue, which may simply involve the mobile robotic device receiving a predetermined height map, among other options. And once the mobile robotic device determines the height map, the mobile robotic device may determine its current location relative to the height map. In doing so, the mobile robotic device may determine information related to the various surface elevations of the ground surface at and/or in the vicinity of the mobile robotic device's current location. Furthermore, once the mobile robotic device determines the current location relative to height map, the mobile robotic device could use that particular information as a basis for determining a current spatial orientation of the distance sensor relative to the ground surface. As an example, the mobile robotic device may determine that the current spatial orientation is in an orientation that results in sensor emissions that are emitted towards the ground surface, among other possibilities.

After the mobile robotic device determines the current spatial orientation of the distance sensor relative to the ground surface, the mobile robotic device may determine an approach for spatially reorienting the distance sensor to a target spatial orientation. Generally, that target spatial orientation may be a spatial orientation at which the distance sensor is oriented to emit sensor emissions that are substantially parallel to the ground surface. However, the target spatial orientation could also take other forms without departing from the scope of the present disclosure. Nonetheless, the mobile robotic device may determine an adjusted position of the leveler to which the leveler is movable to cause the distance sensor to spatially reorient from the current spatial orientation to the target spatial orientation. In practice, this may involve determining an adjusted angular position of the leveler relative to the above-mentioned portion of the mobile robotic device.

Consequently, once the adjusted position of the leveler is determined, the mobile robotic device may then cause the distance sensor to reorient to the target spatial orientation by moving the leveler to the determined adjusted position. In this way, the mobile robotic device can maintain the distance sensor at a desired orientation that allows for avoiding or reducing false and/or missed detection of objects, and perhaps also allows for optimizing range of various distance measurements.

II. Example Warehouse Environment

Example implementations may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example implementations, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various implementations, automating the process of loading and/or unloading delivery trucks at the warehouse and/or the process of creating pallets may include the deployment of one or more different types of robotic devices to move objects or perform other functions. In some implementations, some of the robotic devices can be made mobile by coupling with a wheeled base, a holonomic base (e.g., a base that can move in any direction), or rails on the ceiling, walls, or floors. In additional implementations, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example implementation. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
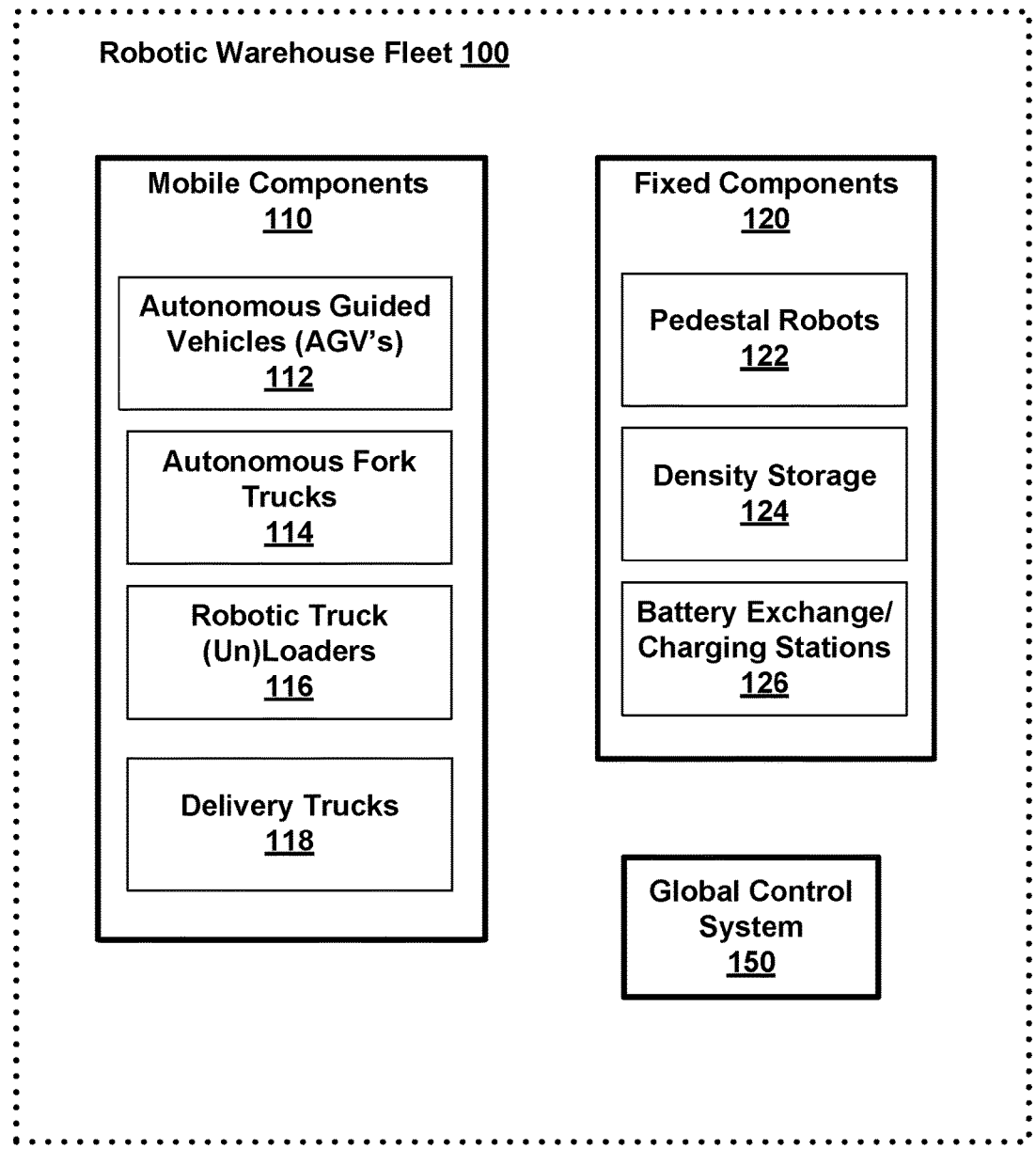
FIG. 1B is a functional block diagram illustrating components of a robotic fleet, according to an example implementation.

FIG. 1B is a functional block diagram illustrating components of a robotic warehouse fleet 100, according to an example implementation. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
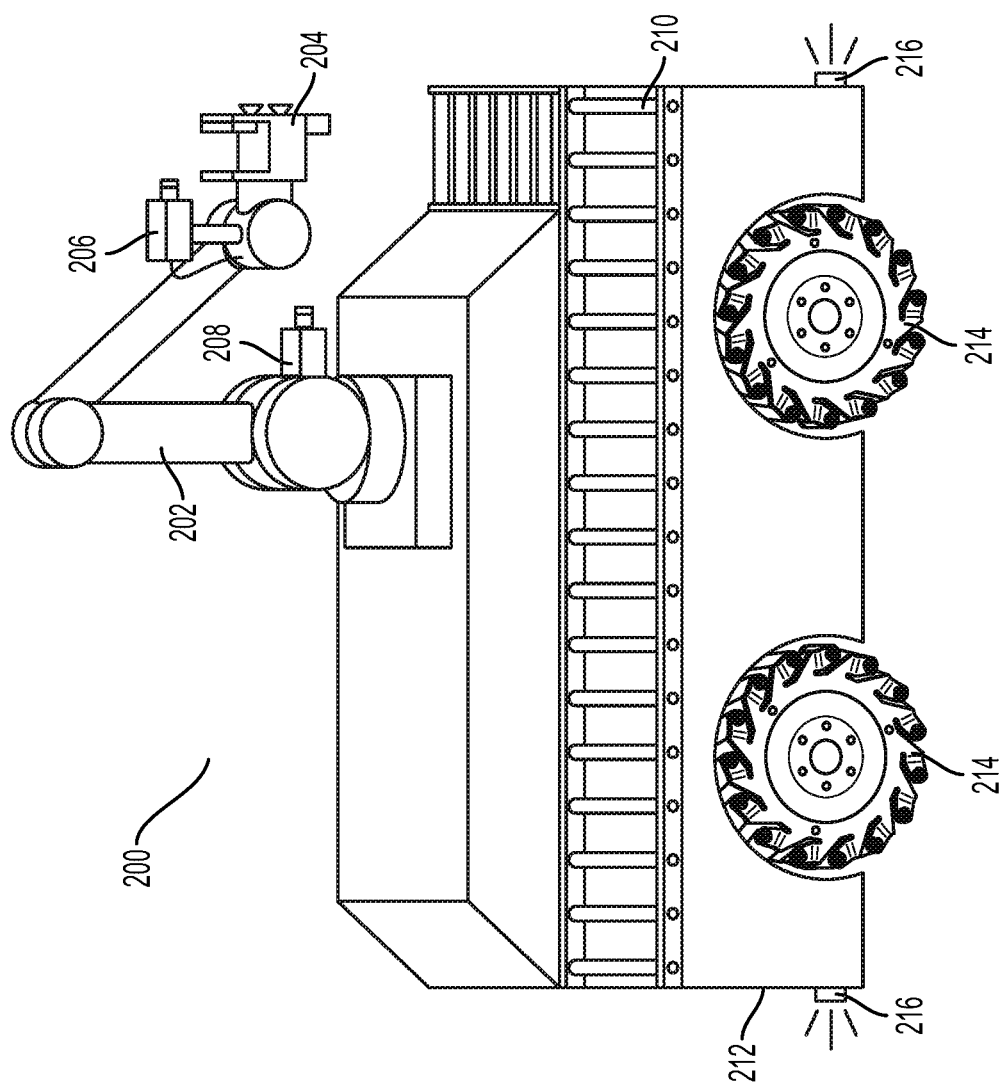
FIG. 2A shows a robotic truck unloader, according to an example implementation.

FIG. 2A illustrates a robotic truck unloader, according to an example implementation. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 are shown to be mecanum wheels, although other types of wheels are possible as well. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example implementation, one or more banks of such batteries could be configured to provide electrical power. Other power supply materials and types are also possible.

Figure 2B:
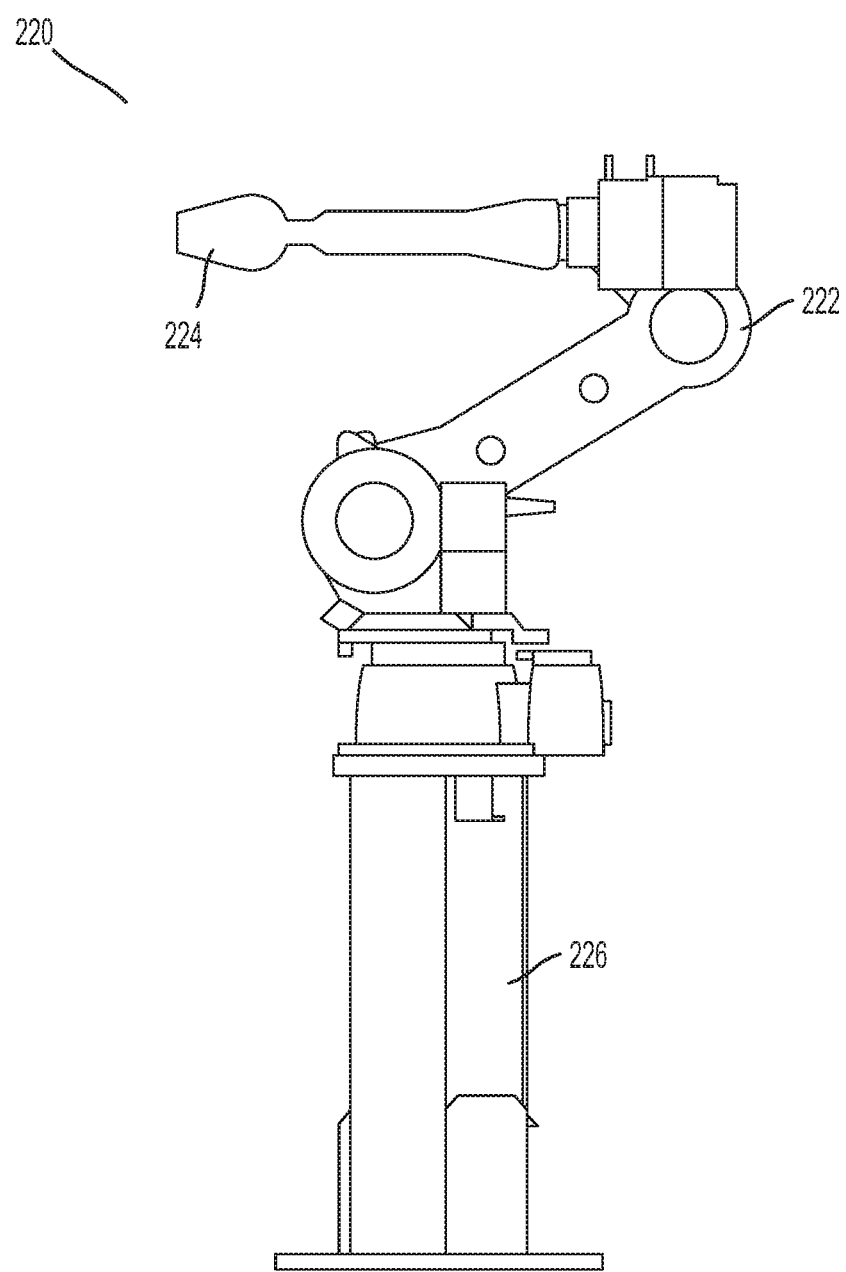
FIG. 2B shows a robotic arm on a pedestal, according to an example implementation.

FIG. 2B illustrates a robotic arm on a pedestal, according to an example implementation. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
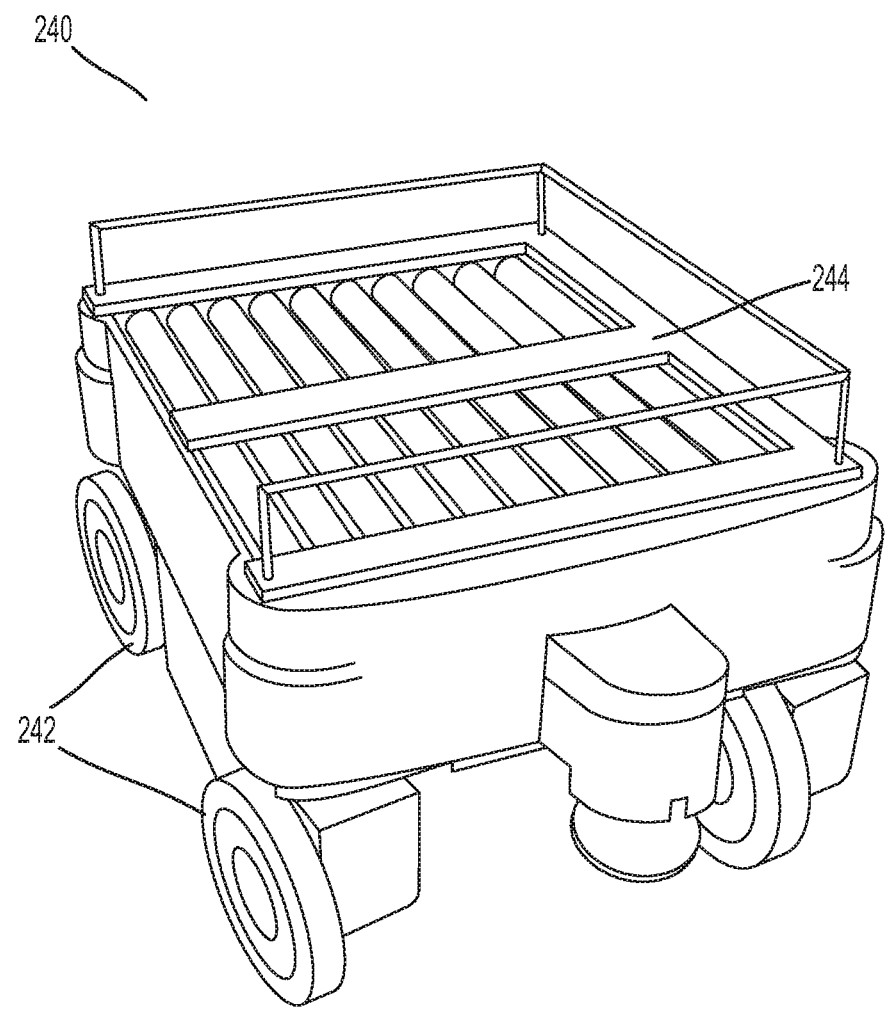
FIG. 2C shows an autonomous guided vehicle, according to an example implementation.

FIG. 2C shows an autonomous guided vehicle (AGV), according to an example implementation. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
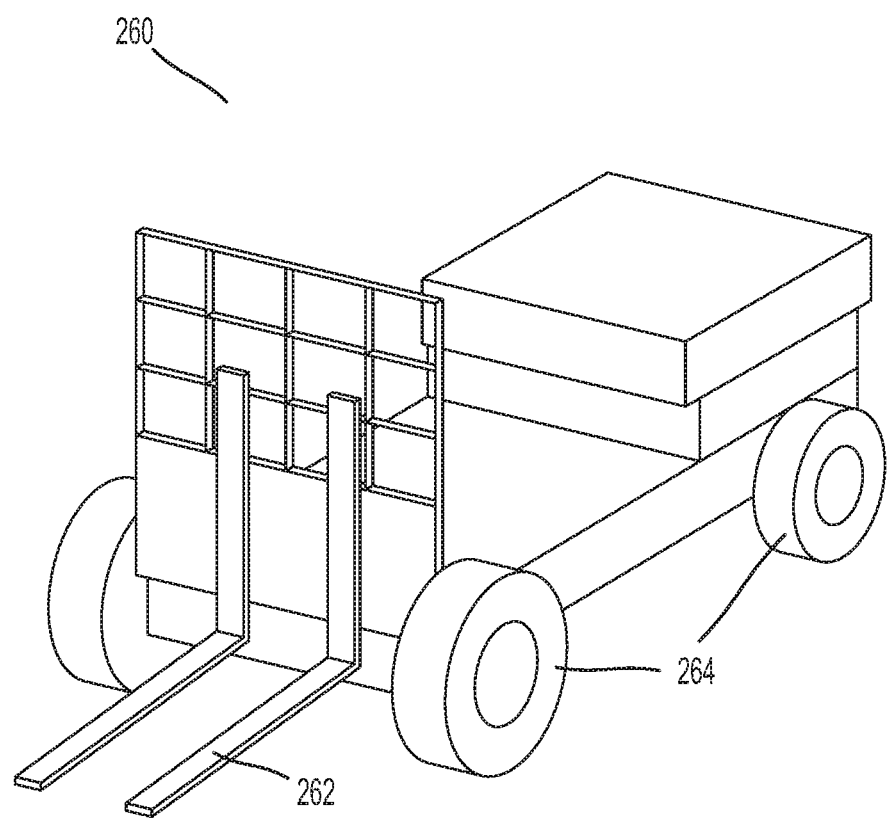
FIG. 2D shows an autonomous fork truck, according to an example implementation.

FIG. 2D shows an autonomous fork truck, according to an example implementation. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

III. Example Configuration of a Robotic Device

Figure 3:
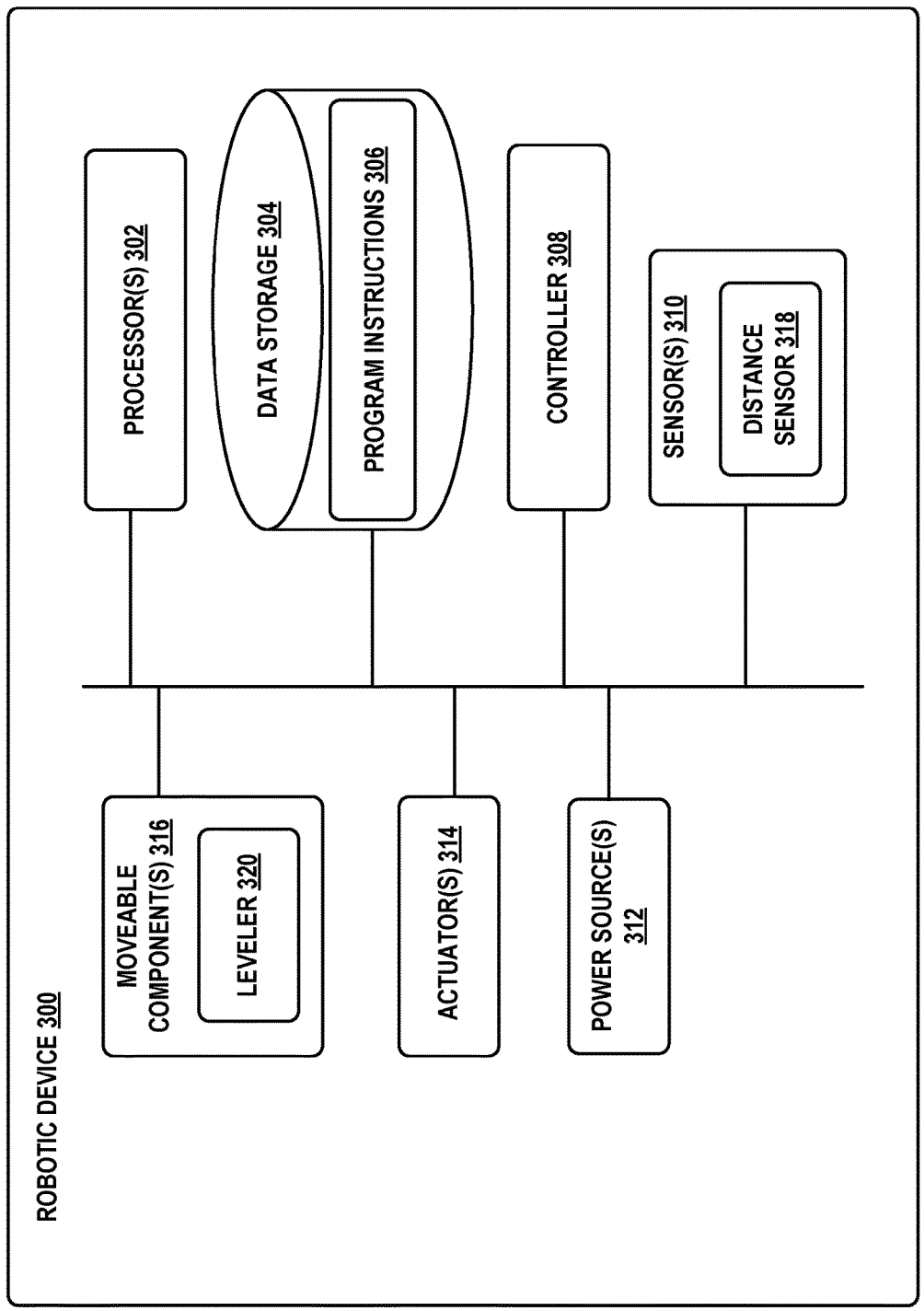
FIG. 3 illustrates components of a robotic device, according to an example implementation.

FIG. 3 next shows an example configuration of a robotic device 300. Robotic device 300 may be any device that has a computing ability and interacts with its surroundings with an actuation capability and/or with ability to emit/generate physical phenomena such as light and/or sound, among others. For example, the robotic device 300 may take the form of any one of the above-described devices, such as of a robotic truck unloader 200, pedestal robot 220, an AGV 240, or an autonomous fork truck 260. In other examples, the robotic device 300 could take the form of a humanoid robot, a robotic arm, a quadruped robot, among others. Additionally, the robotic device 300 may also be referred to as a robotic system, a robotic manipulator, or a robot, among others.

The robotic device 300 is shown to include processor(s) 302, data storage 304, program instructions 306, controller 308, sensor(s) 310 (e.g., a distance sensor 318), power source(s) 312, actuator(s) 314, and movable component(s) 316 (e.g., a leveler 320). Note that the robotic device 300 is shown for illustration purposes only and robotic device 300 may include additional components and/or have one or more components removed without departing from the scope of the disclosure. Further, note that the various components of robotic device 300 may be arranged and connected in any manner.

Processor(s) 302 may be a general-purpose processor or a special purpose processor (e.g., digital signal processors, application specific integrated circuits, etc.). The processor(s) 302 can be configured to execute computer-readable program instructions 306 that are stored in the data storage 304 and are executable to provide the functionality of the robotic device 300 described herein. For instance, the program instructions 306 may be executable to provide functionality of controller 308, where the controller 308 may be configured to instruct an actuator 314 to cause movement of one or more movable component(s) 316, among other operations.

The data storage 304 may include or take the form of one or more computer-readable storage media that can be read or accessed by processor(s) 302. The one or more computer-readable storage media can include volatile and/or non-volatile storage components, such as optical, magnetic, organic or other memory or disc storage, which can be integrated in whole or in part with processor(s) 302. In some implementations, the data storage 304 can be implemented using a single physical device (e.g., one optical, magnetic, organic or other memory or disc storage unit), while in other implementations, the data storage 304 can be implemented using two or more physical devices. Further, in addition to the computer-readable program instructions 306, the data storage 304 may include additional data such as diagnostic data, among other possibilities.

The robotic device 300 may include one or more sensor(s) 310 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 310 may provide sensor data to the processor(s) 302 to allow for appropriate interaction of the robotic device 300 with the environment. Additionally, the robotic device 300 may also include one or more power source(s) 312 configured to supply power to various components of the robotic device 300. Any type of power source may be used such as, for example, a gasoline engine or a battery.

The robotic device 300 may also include one or more actuator(s) 314. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 314 may cause movement of various movable component(s) 316 of the robotic device 300. The moveable component(s) 316 may include appendages such as robotic arms, legs, and/or hands, among others. The moveable component(s) 316 may also include a movable base, wheels, and/or end effectors, among others. Further, when a robotic device 300 includes at least one end effector, such an end effector may be a tool and/or a gripper, among others.

In accordance with the present disclosure, the robotic device 300 may also include at least one distance sensor 318 coupled to an adjustable leveler 320. In particular, the distance sensor 318 may be used by the robotic device 300 to determine presence of one or more objects in the environment, to determine respective locations of one or more objects, and/or to respectively identify one or more objects, among other possibilities. In this way, the distance sensor 318 may help the robotic device 300 navigate the environment, avoid obstacles, and/or identify objects to be manipulated, among others.

Generally, the distance sensor 318 may be configured to detect radiation reflected from at least one object in the environment. Also, the distance sensor 318 may be configured to generate a signal that corresponds to the detected radiation and thus provides to the robotic device 300 data about the environment in which the robotic device 300 is operating. In practice, that data may be in form of distance measurements each indicating a distance between the distance sensor and at least one point in the environment, among other possibilities.

Moreover, the source of the detected reflected radiation may be emissions emitted by an emitter of the robotic device 300. In particular, the emitter may emit emissions that are reflected from objects in the environment and then detected by the distance sensor 318 so as to gain the data about the environment. Generally, the emissions may be electromagnetic radiation that falls within any feasible portion of the electromagnetic spectrum and thus the emissions may include (without limitation): radio waves, microwaves, infrared radiation, and/or visible light, among others. Additionally or alternatively, the emissions may be acoustic emissions including acoustic waves that fall within any feasible portion of the acoustic frequency spectrum. Other types of emissions are possible as well.

In an example arrangement, the emitter may be incorporated as part of a sensor system used for such detection, such as by being incorporated as part of the distance sensor 318 itself. With this arrangement, the distance sensor 318 could thus take the form of a light detection and ranging (LIDAR) sensor, a time-of-flight (ToF) laser sensor, ultrasonic sensor, stereoscopic sensor, visual depth-by-motion sensor, laser or LED triangulation sensing, among others. In other arrangements, however, the emitter may be physically separate from the distance sensor 318. Other arrangements are possible as well.

In some cases, the distance sensor 318 may be a two-dimensional (2D) horizontal planar distance sensor. In particular, a 2D distance sensor may be configured to emit emissions that substantially travel along a 2D plane in physical space. Also, the 2D distance sensor would ideally be arranged on the robotic device 300 so as to emit such emissions that are substantially parallel to the ground surface on which the robotic device 300 is travelling. Moreover, the 2D distance sensor would ideally be arranged on the robotic device 300 so as to receive reflected radiation along a substantially parallel plane relative to the ground surface. In some situations, however, the robotic device 300 may encounter a change in elevation while traveling on the ground surface (e.g., curvature of the ground surface may change), which may result in the 2D distance sensor no longer emitting emissions that are substantially parallel to the ground surface and/or no longer receiving reflected radiation along a substantially parallel plane relative to the ground surface.

To help compensate for such change in elevation, the robotic device 300 may be equipped with a leveler 320 configured to spatially reorient the distance sensor 318 relative to the ground surface on which the robotic device 300 is traveling. More specifically, the leveler 320 may be any mechanical feature that is directly or indirectly attached to a portion of the robotic device 300 and is movable relative to that portion of the robotic device 300. In practice, the leveler 320 may take on any feasible form, may be composed of any feasible material, and may be of any feasible size and shape. For instance, the leveler 320 could take the form of a leveling plate, among other possibilities. Moreover, the leveler 320 may be arranged in one of various ways so as to be configured spatially reorient the distance sensor 318 relative to the ground surface.

In particular, the leveler 320 may be coupled to a portion of the robotic device 300 in any feasible manner. For example, leveler 320 may be coupled to a portion of the robotic device 300 by way of a hinge or other mechanical bearing, thereby allowing a change of angular position of the leveler 320 relative to that portion of the robotic device 300. In another example, the leveler 320 may simply be a part of an actuator 314 and that part may be directly connected to the distance sensor 318. In this way, the actuator 314 may be configured to apply via the leveler 320 one or more forces that cause the distance sensor 318 to spatially reorient.

In yet another example implementation, the leveler 320 may be a mechanical feature that is not part of an actuator 314, which, in some situations, could help provide flexibility with regards to arrangement of the various components of the mobile robotic device, among other possible advantages. In particular, at least one actuator 314 of the robotic device 300 may be configured to apply one or more forces to the leveler 320 that cause the leveler 320 to move relative to a portion of the robotic device 300. For example, the robotic device 300 may direct the actuator 314 to apply one or more forces that cause a change of angular position of the leveler 320 relative to that portion of the robotic device 300. Further, in some arrangements, the leveler 320 could also be arranged so that the robotic device 300 could additionally or alternatively change a linear position of the leveler 320.

Regardless of the particular implementation, the robotic device 300 may also include at least one encoder (not shown) or the like that the robotic device 300 may use to determine position of the leveler 320. In particular, the encoder may be coupled to the leveler 320 (which could be part of an actuator or coupled to an actuator) and/or to the actuator 314 configured to move the leveler, among other options. In either case, the encoder may output data representative of a current position of the leveler 320 and/or of a change in position of the leveler 320. Moreover, the encoder may be an angular encoder that outputs data representative of an angular position and/or a change in angular position. Additionally or alternatively, the encoder may be a linear encoder that outputs data representative of a linear position and/or a change in linear position. Nonetheless, the robotic device 300 may determine position of the leveler 320 based on the data provided by the encoder.

Furthermore, the distance sensor 318 may be coupled to the leveler 320 in any feasible manner. For example, the distance sensor 318 may be bolted onto the leveler 320, glued onto the leveler, or connected via any other mechanical connection. In either case, the distance sensor 318 may be arranged on the leveler 320 in any feasible manner. For instance, the distance sensor 318 may be arranged in an upright position or could be arranged upside down, among other possibilities.

Figure 4A:
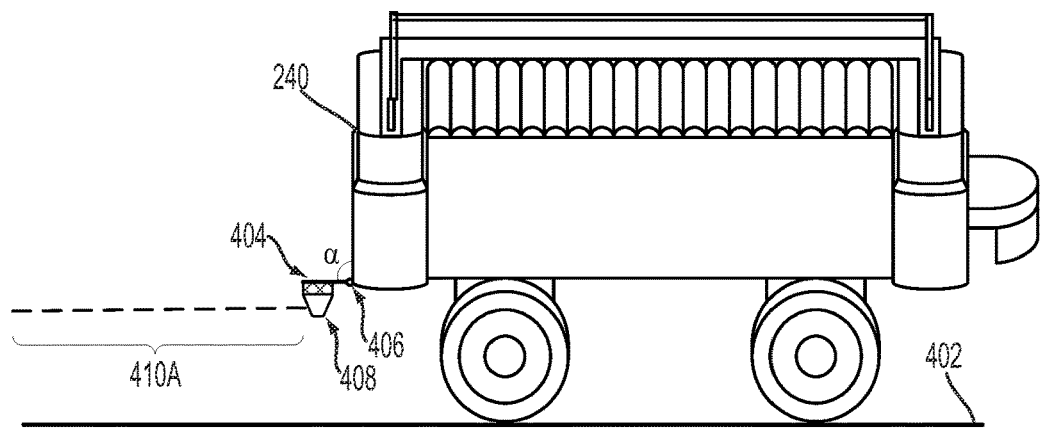
FIG. 4A to 4C illustrate a robotic device including an adjustable leveler, according to an example implementation.
Figure 4B:
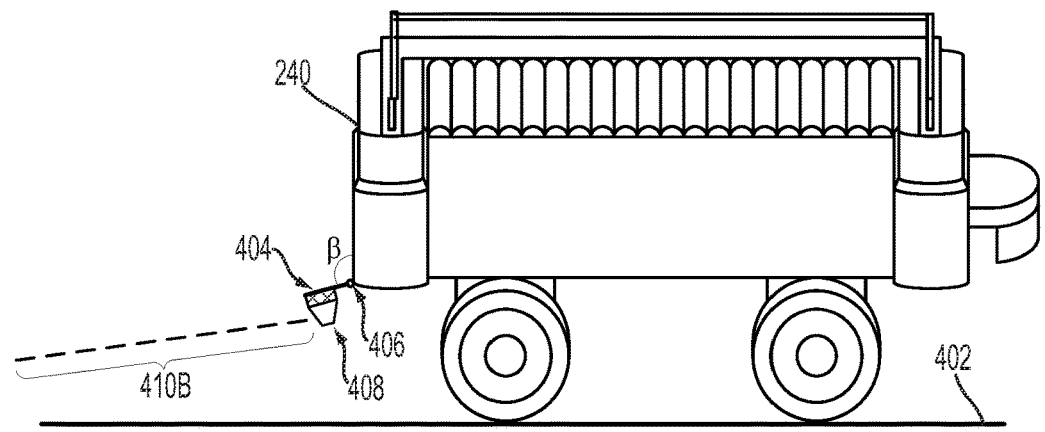
Figure 4C:
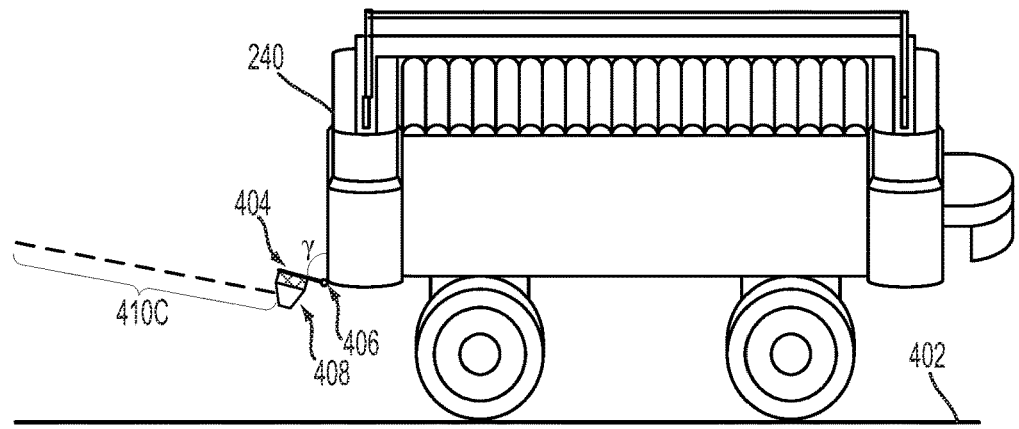

FIGS. 4A to 4C illustrate the AGV 240 traveling on a ground surface 402. As shown, a leveling plate 404 is connected to a portion of the AGV 240 via a connector arrangement 406. Also, a distance sensor 408 is shown as connected to the leveling plate 404 in an upside down position. With this arrangement, the AGV 240 may be configured to cause the distance sensor 408 to spatially reorient by moving the leveling plate 404.

In particular, FIG. 4A illustrates that the leveling plate 404 is at an angular position $\alpha$ relative to a portion of the AGV 240 and thus that the distance sensor 408 is spatially oriented to emit emissions 410A in a particular direction relative to the AGV 240. Further, FIG. 4B illustrates that the leveling plate 404 is at an angular position $\beta$ relative to the portion of the AGV 240 and thus that the distance sensor 408 is spatially oriented to emit emissions 410B in another direction relative to the AGV 240. Yet further, FIG. 4C illustrates that the leveling plate 404 is at an angular position $\gamma$ relative to the portion of the AGV 240 and thus that the distance sensor 408 is spatially oriented to emit emissions 410C in yet another direction relative to the AGV 240. As such, the AGV 240 may be configured to move the leveling plate 404 between these various angular positions $\alpha$, $\beta$, and $\gamma$ (and perhaps also other positions) so as to spatially reorient the distance sensor 408.

Note that, although FIGS. 4A to 4C illustrate a leveler and a distance sensor arranged on an AGV in accordance with the present disclosure, a leveler and a distance sensor could be arranged on any robotic device, such as any of those described herein. Other illustrations are possible as well.

IV. Illustrative Methods

Figure 5:
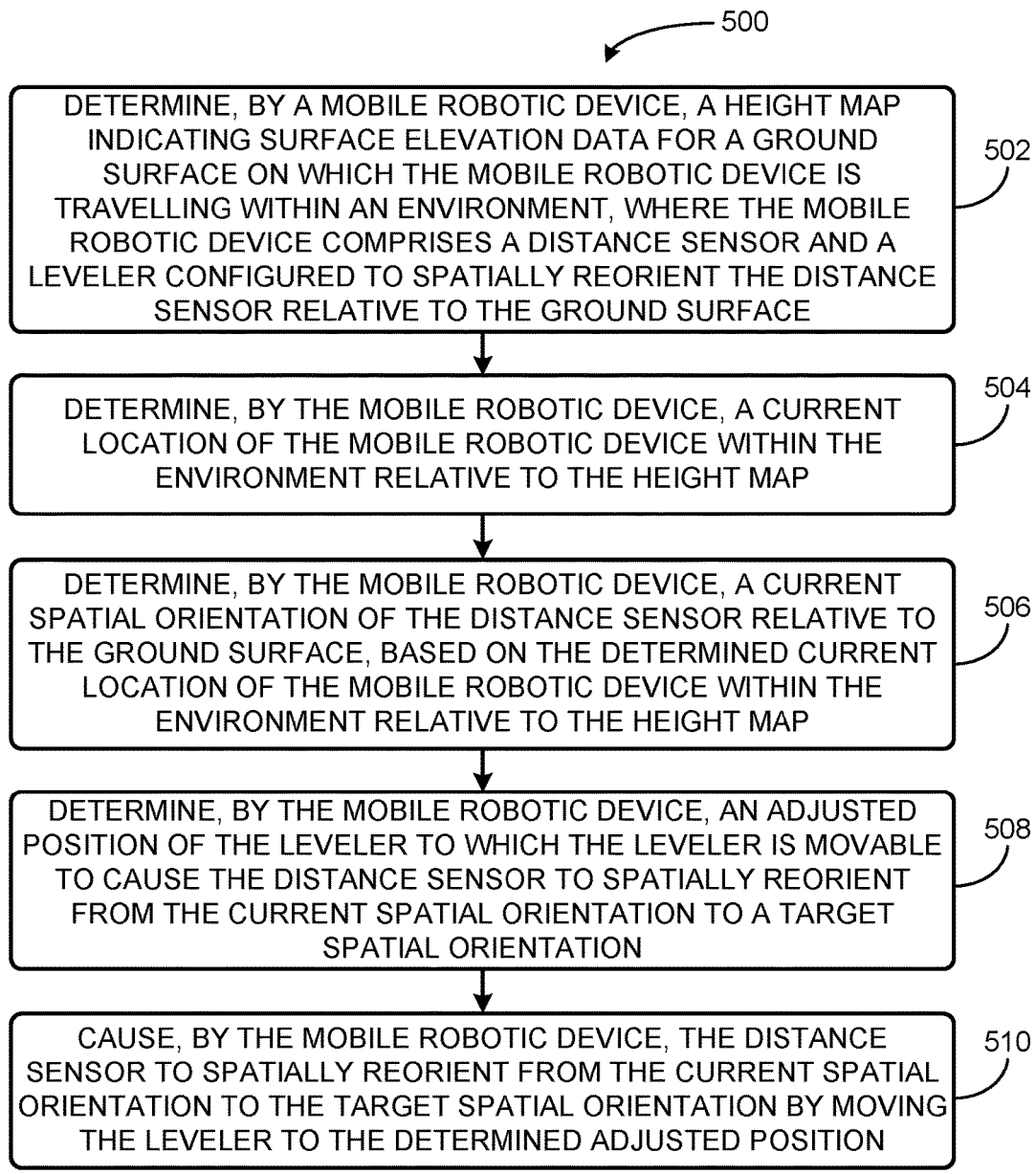
FIG. 5 is a flowchart for reorienting a distance sensor, according to an example implementation.

FIG. 5 is a flowchart illustrating a method 500, according to an example implementation. In particular, method 500 may be implemented to spatially reorient a distance sensor of a robotic device.

Method 500 shown in FIG. 5 (and other processes and methods disclosed herein) presents a method that can be implemented within an arrangement involving, for example, the robotic device 300 (or more particularly by one or more components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, method 500 involves determining, by a mobile robotic device, a height map indicating surface elevation data for a ground surface on which the mobile robotic device is travelling within an environment (e.g., a warehouse), where the mobile robotic device comprises a distance sensor and a leveler configured to spatially reorient the distance sensor relative to the ground surface.

In an example implementation, a height map may indicate various forms of information about the ground surface. In particular, the height map may include elevation data for each of a plurality of points and/or areas on the ground surface. For example, the height map may associate each point respectively with a particular elevation that is relative to a fixed reference elevation (e.g., mean sea level (MSL)). In practice, the mobile robotic device may use the height map to determine curvature of a certain area of the ground surface and/or a change in elevation between certain points of the ground surface, among other possibilities. Nonetheless, the mobile robotic device may determine the height map in various ways.

In one case, the mobile robotic device may receive the height map from a control system, such as from the global control system 150 for instance, and may do so by requesting the height map and/or by receiving the height map from time-to-time (e.g., when the control system updates the height map). In practice, the control system at issue may be configured with the height map via manual engineering input. Additionally or alternatively, the control system may be in communication with one or more sensors in the environment and may thus receive, from such sensors, sensor data based on which the control system may determine or otherwise generate the height map.

For example, the control system may receive distance measurements from fixed distance sensors and/or those arranged on mobile robotic devices and, based on such distance measurements, the control system may determine the height map. The control system could do so in various ways. For instance, the control system may determine an elevation of a distance sensor relative to the fixed reference elevation and may obtain from that distance sensor a distance measurement of a certain point on the ground surface. Then, based at least on the elevation of the distance sensor relative to the fixed reference elevation and on the distance measurement of the point, the control system may determine an elevation of that point on the ground surface. In this way, the control system may determine elevation of each of various points on the ground surface so as to generate the height map. Other examples are possible as well.

In another case, the mobile robotic device may use the distance sensor arranged on the mobile robotic device to receive distance measurements based on which the mobile robotic device may then determine or otherwise generate the height map. In particular, the mobile robotic device may receive, from the distance sensor, sensor data indicative of one or more distance measurements each indicating a respective distance between the distance sensor and a respective point on the ground surface. Then, the mobile robotic device may use such distance measurements to generate a height map and may do so in one of various ways.

For example, the mobile robotic device may receive a first distance measurement for a first point on the ground surface and may associate that first point with the first distance measurement. Moreover, the mobile robotic device may designate that first point as a reference point corresponding to a reference elevation. Then, the mobile robotic device may receive a second distance measurement for a second point on the ground surface and may associate that second point with the second distance measurement. In this example, the mobile robotic device may determine a difference between these distance measurements. And based on the determined difference, the mobile robotic device may determine a spatial position of the second point relative to a spatial position the first point (i.e., the reference point). Thus, given these spatial positions, the mobile robotic device may have information indicating elevation of the second point relative to reference elevation. Various other examples are possible as well without departing from the scope of the present disclosure.

Moreover, the mobile robotic device may carry out various movements so as to obtain distance measurements for various points on the ground surface ("sweeping the ground surface"). For example, the mobile robotic device may receive distance measurements while the mobile robotic device travels on the ground surface. In doing so, the mobile robotic device may receive distance measurements respectively for points within a portion of the ground surface that corresponds to the direction of travel of the mobile robotic device. In another example, the mobile robotic device may receive distance measurements while the mobile robotic device causes the leveler to move through one or more positions. In practice, the mobile robotic device may obtain distance measurements while traveling yet without concurrently causing the leveler to move, may obtain distance measurements while causing the leveler to move yet not concurrently traveling, and/or may obtain distance measurements while traveling and also concurrently causing the leveler to move, among other possibilities. In this manner, the mobile robotic device may independently generate a height map using distance measurements obtained for a plurality of point throughout the ground surface. Other examples are possible as well.

Yet further, the mobile robotic device could also use sensor scans obtained by the distance sensor to assist with localization. For example, the mobile robotic device may use the distance sensor to detect well-defined features in the environment, such as walls and columns for instance. In doing so, the mobile robotic device may receive consistent distance measurements because those measurements may be nearly perpendicular to the emission of the distance sensor. And using such measurements, the mobile robotic device may accurately determine the mobile robotic device's location within the environment. Thus, using the combination of these localization techniques and the above-mentioned height measurements (i.e., distance measurements for various points on the ground surface), the mobile robotic device may accurately determine the relative ground surface height at a particular determined location and may do so for each of various locations throughout the environment. Moreover, the mobile robotic device may use such localization to augment an existing height map (e.g., obtained from a control system).

Furthermore, in some arrangements, the mobile robotic device may determine the height map based on distance measurements obtained by one or more distance sensors other than the distance sensor arranged on the mobile robotic device itself. For example, the mobile robotic device may receive distance measurements from fixed distance sensors and/or those arranged on one or more other mobile robotic devices and, based on such distance measurements, the mobile robotic device at issue may determine the height map in accordance with the techniques discussed herein. In practice, the mobile robotic device may thus determine the height map based on one or both of the distance measurements obtained from external sensors and/or those obtained from the distance sensor arranged on the mobile robotic device.

In yet another case, the mobile robotic device may be configured with the height map via manual engineering input. For example, a user may manually generate a height map via a computer modeling software or the like, and may then upload the generated height map onto the mobile robotic device. Other cases and combinations of the described cases are possible as well.

Figure 6:
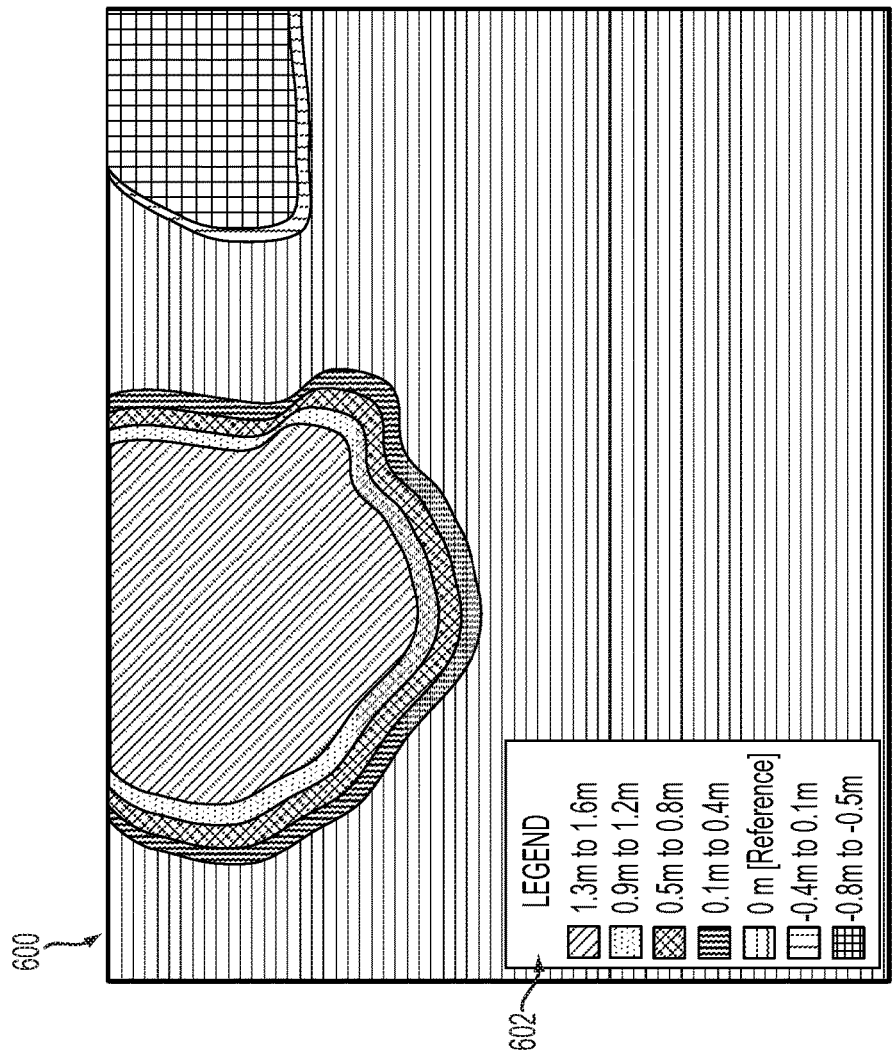
FIG. 6 illustrates a height map, according to an example implementation.

FIG. 6 illustrates a visual representation of a height map 600, in accordance with an example implementation. As shown, the map 600 includes various patterns each representative of a certain range of elevations, with such representations being illustrated by the legend 602. For example, the legend 602 indicates that a horizontal striped pattern represents a reference elevation and that a square pattern represents an elevation range between −0.8 meters and −0.5 meters. As such, when the mobile robotic device seeks to determine an elevation for a particular location (e.g., particular point) on the ground surface, the mobile robotic device may refer to the height map 600 to determine the particular elevation at that particular location.

Further, although FIG. 6 illustrates a visual representation of a height map, the mobile robotic device may have stored thereon or could otherwise have access to a height map that could take on one of various forms. For example, the height map could take the form of mapping data the maps each of a plurality of points on the ground surface with a respective elevation. Thus, the mobile robotic device may determine an elevation of a particular point on the ground surface based on the mapping data. Also, the mobile robotic device may determine curvature of a portion of the ground surface by determining points located within that portion and then using the mapping data to determine a respective elevation of each such point. Other illustrations and examples are also possible.

Referring back to FIG. 5, at block 504, method 500 involves determining, by the mobile robotic device, a current location of the mobile robotic device within the environment relative to the height map.

In an example implementation, the mobile robotic device may use one of various techniques to determine a current location of the mobile robotic device within the environment, with that current location being specified relative to a reference coordinate system, among other options. For example, the mobile robotic device may use a global positioning system (GPS) to determine the current location. In another example, the mobile robotic device may use sensors to detect one or more markers (e.g., reflective markers) within the environment and may determine the current location relative to the detected markers. Other examples are also possible.

Furthermore, the mobile robotic device may determine the current location relative to the height map. In particular, the mobile robotic device may determine at least one point in the height map that corresponds to the current location of the mobile robotic device. For example, the mobile robotic device may determine one or more points of the ground surface that are underneath the physical space which the mobile robotic device occupies at the current location. In another example, the mobile robotic device may determine one or more points within a portion of the ground surface that corresponds to the direction of travel of the mobile robotic device, which may essentially be a portion of the ground surface that is "in front" of the mobile robotic device. In either example, the mobile robotic device may determine the corresponding point(s) within coordinates of the height map for instance. Other examples are also possible.

At block 506, method 500 involves determining, by the mobile robotic device, a current spatial orientation of the distance sensor relative to the ground surface, based on the determined current location of the mobile robotic device within the environment relative to the height map. Also, at block 508, method 500 involves determining, by the mobile robotic device, an adjusted position of the leveler to which the leveler is movable to cause the distance sensor to spatially reorient from the current spatial orientation to a target spatial orientation. Further, at block 510, method 500 involves causing, by the mobile robotic device, the distance sensor to spatially reorient from the current spatial orientation to the target spatial orientation by moving the leveler to the determined adjusted position.

In practice, a spatial orientation may define how a physical entity is placed within the physical space in which that entity is located. Also, a spatial orientation may be mathematically represented relative to a frame of reference, such as a cartesian coordinate system for instance. Moreover, a mathematical representation of a spatial orientation may take on one of various forms, such as of Euler angles or of an orientation vector, among others forms currently known or developed in the future. In this way, the mobile robotic device could determine or otherwise have access to information representative of a spatial orientation of a component of the mobile robotic device, such as of the distance sensor for example. And generally, the spatial orientation of distance sensor relative to the ground surface may depend on characteristics of the ground surface.

In particular, if the elevation of the ground surface on which the mobile robotic device travels remains constant and assuming that the distance sensor is in a fixed position relative to the mobile robotic device, then the spatial orientation of the distance sensor relative to the ground surface may remain the same over time. However, if the elevation of the ground surface on which the mobile robotic device travels changes and assuming that the distance sensor is still in a fixed position relative to the mobile robotic device, then the spatial orientation of the distance sensor relative to the ground surface may change over time. In practice, this change in spatial orientation may result in the distance sensor being oriented away from objects in the environment and/or being oriented towards the ground surface, which could ultimately lead to false and/or missed detections.

Thus, the mobile robotic device may be configured to use the height map so as to determine the current spatial orientation of the distance sensor relative to the ground surface on which the mobile robotic device is traveling. In particular, given that the height map provides data about surface elevation and/or curvature of the ground surface, the mobile robotic device may use the height map to determine one or more elevations of the ground surface at the current location of the mobile robotic device, to determine a change in elevation of the ground surface from a previous location of the mobile robotic device to the current location of the mobile robotic device, to determine a curvature of the ground surface at the current location of the mobile robotic device, and/or to determine a change in curvature of the ground surface from a previous location of the mobile robotic device to the current location of the mobile robotic device, among others. Then, the mobile robotic device may use that information in one of various ways so as to determine the current spatial orientation of the distance sensor.

By way of example, the mobile robotic device may select at least one point on the ground surface that corresponds to the current location of the mobile robotic device, such as a point within the portion of the ground surface that is "in front" of the mobile robotic device for instance. Then, the mobile robotic device may use the height map as basis to determine a current spatial orientation of the leveler relative to that select point on the ground surface. Moreover, given that the distance sensor is coupled to the leveler in a certain manner (e.g., "upside down"), the current spatial orientation of the distance sensor may correspond to the current spatial orientation the leveler. As such, the mobile robotic device may determine a current spatial orientation of the distance sensor that corresponds to the current spatial orientation the leveler.

For instance, if the distance sensor is positioned at a ninety degree angle relative to the leveler and the mobile robotic device determines that the leveler is at a particular spatial orientation relative to the select point, then the mobile robotic device may determine the spatial orientation of distance sensor by computationally applying a ninety degree spatial translation to the determined particular spatial orientation of the leveler. In another instance, the mobile robotic device may have stored thereon or otherwise have access to mapping data that map each of various spatial orientations of the leveler with a corresponding spatial orientation of the distance sensor. In this instance, once the mobile robotic device determines the spatial orientation of the leveler, the mobile robotic device may refer to the mapping data to determine the corresponding spatial orientation of the distance sensor. Other instances are possible as well.

As noted, the mobile robotic device may use the height map as basis to determine a current spatial orientation of the leveler relative to the select point on the ground surface. In practice, the mobile robotic device may do so in one of various ways. In one example approach, the mobile robotic device may determine a current position of leveler relative to a portion of the mobile robotic device. Additionally, the mobile robotic device may use the height map and/or other information (e.g., from an inertial measurement unit (IMU)) as basis to determine a current spatial orientation of the mobile robotic device, such a spatial orientation relative to the select point.

For instance, the mobile robotic device may include an IMU and may use data from that IMU (among other data) so as to determine the current spatial orientation of the mobile robotic device. In another instance, given accurately determined localization of the mobile robotic device (e.g., three degree of freedom positioning and heading) as well as information about mobile robotic device configuration (e.g., size, number of wheels, suspension type), the mobile robotic device may determine a plane from the height map where wheels of the mobile robotic device are in contact with the ground surface, and the mobile robotic device may then determine or otherwise approximate the current spatial orientation of the mobile robotic device that corresponds to the determined plane. In yet another instance, the mobile robotic device may use any feasible combination of data from the IMU and information from the height map so as to determine the current spatial orientation. Other instances are also possible.

Finally, based on the determined current position of leveler relative to a portion of the mobile robotic device and on the determined current spatial orientation of the mobile robotic device relative to the select point, the mobile robotic device may determine the current spatial orientation of the leveler relative to the select point and thus ultimately the corresponding current spatial orientation of the distance sensor.

As an example implementation of this approach, the mobile robotic device may determine (e.g., using an encoder) that the current position of leveler is the above-mentioned angular position $\alpha$. Additionally, the mobile robotic device may determine that the height map is indicative of a particular curvature of the ground surface at the current location and thus that the mobile robotic device is at a particular angular orientation $\delta$ relative to the select point. Consequently, the mobile robotic device may offset the particular angular orientation $\delta$ by the angular position $\alpha$ so as to determine the current spatial orientation of the leveler relative to the select point and thus ultimately the corresponding current spatial orientation of the distance sensor. Other examples and approaches also possible.

Once the mobile robotic device determines the current spatial orientation of the distance sensor relative to the ground surface, the mobile robotic device may then use the disclosed leveler arrangement to spatially reorient the distance sensor to a target spatial orientation if necessary.

More specifically, the mobile robotic device may have stored thereon or may otherwise have access to information that specifies at least one target spatial orientation of the distance sensor, which could be specified as a target spatial orientation relative to the ground surface, among other options. In accordance with the present disclosure, the target spatial orientation may be a spatial orientation at which the distance sensor is oriented to emit sensor emissions that are substantially parallel to the ground surface and/or a spatial orientation at which the distance sensor is oriented to receive reflected radiation along a substantially parallel plane relative to the ground surface. As such, the target spatial orientation may be one at which the distance sensor would ideally avoid false and/or missed detections of objects in the environment. However, the present disclosure may also be carried out in the context of other target spatial orientations as well.

Generally, the mobile robotic device may encounter one of various triggers that may lead to the mobile robotic device responsively reorienting the distance sensor. For instance, after determining the current spatial orientation of the distance sensor relative to the ground surface, the mobile robotic device may use the determined current location (and/or a determined direction of travel) of the mobile robotic device relative to the height map as basis for determining whether or not the current spatial orientation of the distance sensor is different from the target spatial orientation of the distance sensor. As such, if the mobile robotic device determines that the current spatial orientation is different from the target spatial orientation, then the mobile robotic device may responsively reorient the distance sensor as further described herein. Whereas, if the mobile robotic device determines that the current spatial orientation is the target spatial orientation, then the mobile robotic device may responsively not reorient the distance sensor.

In some cases, the mobile robotic device may reorient the distance sensor based on whether the current spatial orientation is different from the target spatial orientation by at least a threshold amount, such as by at least a threshold angular positional difference for instance. As such, if the mobile robotic device determines that the current spatial orientation is different from the target spatial orientation by at least a threshold amount, then the mobile robotic device may responsively reorient the distance sensor as further described herein. Whereas, if the mobile robotic device determines that the current spatial orientation different from the target spatial orientation by less than the threshold amount (or perhaps not different at all), then the mobile robotic device may responsively not reorient the distance sensor.

By way of example, the mobile robotic device may determine that the current spatial orientation of the distance sensor is a spatial angular orientation $\lambda$, relative to the ground surface (e.g., an angular offset relative to a particular axis of a coordinate system) and that the target spatial orientation of the distance sensor is a spatial angular orientation $\mu$ relative to the ground surface (e.g., another angular offset relative to the particular axis of the coordinate system). Then, the mobile robotic device may determine a difference between the spatial angular orientation $\lambda$, and the spatial angular orientation $\mu$. Finally, if the mobile robotic device determines that the difference is higher than a threshold angular positional difference (e.g., higher than a 10° difference), then the mobile robotic device may responsively reorient the distance sensor as further described herein. Otherwise, the mobile robotic device may not reorient the distance sensor. Other examples are also possible.

In accordance with the present disclosure, the mobile robotic device may determine an adjusted position of the leveler to which the leveler is movable to cause the distance sensor to spatially reorient from the current spatial orientation to the target spatial orientation. In particular, if the mobile robotic device moves the leveler to the adjusted position, then the distance sensor may correspondingly move along with the leveler and may thus end up at the target spatial orientation. As such, the mobile robotic device may determine the adjusted position of the leveler in various ways.

For instance, the mobile robotic device may determine a particular change in spatial orientation of the distance sensor that may cause the distance sensor to spatially reorient from the determined current spatial orientation to the target spatial orientation. Then, the mobile robotic device may use the determined particular change as basis for determining a particular adjustment to position of the leveler away from the current position of the leveler. Finally, the mobile robotic device may determine the adjusted position based on that particular adjustment away from the current position. Moreover, in this regard, the mobile robotic device may determine the particular change in spatial orientation based on that change compensating for a determined difference between the current spatial orientation of the distance sensor and the target spatial orientation of the distance sensor and/or based on other factors.

For example, the mobile robotic device may determine a difference between the current spatial angular orientation $\lambda$, of the distance sensor and the target spatial angular orientation $\mu$ of the distance sensor, which may be a difference of $\omega$ (e.g., $\omega=\lambda-\mu$). In this example, the mobile robotic device may determine that the particular change in spatial orientation of the distance sensor is a spatial angular shift $\omega$ (e.g., an angular shift $\omega$ relative to a particular axis of a coordinate system). Moreover, given this determined particular change in spatial orientation, the mobile robotic device may thus determine that the leveler should be adjusted by an angular displacement $\omega$. As such, assuming that the current angular position of the leveler is the above-mentioned angular position $\alpha$, the mobile robotic device may apply the angular displacement $\omega$ to the angular position $\alpha$ so as to determine the adjusted position of the leveler, which may be the above-mentioned angular position $\beta$ (e.g., $\beta=\alpha-\omega$) for instance. In this manner, determining the adjusted position of the leveler may essentially involve determining an adjusted angular position of the leveler relative to a particular portion of the mobile robotic device. Other instances and examples are possible as well.

Once the mobile robotic device determines the adjusted position of the leveler to which the leveler is movable to cause the distance sensor to spatially reorient to the target position, the mobile robotic device may then cause the distance sensor to reorient to the target position by moving the leveler to the determined adjust position. To do so, the mobile robotic device may direct at least one actuator to provide one or more particular forces to the leveler that may cause the leveler to move to the adjusted position. In this way, the mobile robotic device may use the disclosed leveler arrangement to reorient the distance sensor to the target position and do so when encountering a change in elevation of the ground surface on which the mobile robotic device is currently traveling.

In a further aspect, the mobile robotic device may use one or more of various possible cost functions and/or techniques so as to optimize the target spatial orientation of the distance sensor.

For example, the mobile robotic device may evaluate the height map to determine local maxima within a given range of a function (e.g., corresponding to a current location). Then, the mobile robotic device may use the determined local maxima as basis to determine a target spatial orientation of the distance sensor at which the sensor may carry out detections that overcome the local maxima ("looking over the local maxima"), which may help avoid obstruction of the distance sensor's field of view. Additionally or alternatively, the mobile robotic device may evaluate the height map to determine local minima within a given range of a function (e.g., corresponding to a current location). Then, the mobile robotic device may use the determined local minima as basis to determine a target spatial orientation of the distance sensor at which the sensor may carry out detections that correspond to the local minima ("looking into the local minima"), which may help detect obstacles at or near the local minima that the distance sensor may otherwise miss.

In another example, the mobile robotic device may determine unobstructed points that the distance sensor already scanned (e.g., approximate visible range) and may then use root mean square (RMS) or another plane-fitting regression technique to best fit a plane onto such points. Then, the mobile robotic device may determine a target spatial orientation of the distance sensor that corresponds to that plane, which may help minimize occlusions to the distance sensor.

In yet another example, the mobile robotic device may incorporate information about the mobile robotic device as part of the optimization. For instance, the mobile robotic device may use the mobile robotic device's kinematic capabilities and/or trajectory to initially optimize the target spatial orientation for a local space where the mobile robotic device may move. In particular, this optimization may be carried out such that the "return region" (area where reflected emissions are within a certain height) matches a polygon that is sized and shaped based on the mobile robotic device's kinematic capabilities and trajectory. Then, the mobile robotic device may use other techniques (e.g., above-described local minima/maxima and/or plane fitting) to additionally optimize the target spatial orientation for an area beyond the return region.

In yet another example, the mobile robotic device may use information about a planned trajectory of the mobile robotic device to filter the optimization criteria. For instance, the mobile robotic device may determine a region substantially in the vicinity of the planned trajectory, such as a region encompassing the width of the mobile robotic device for a certain distance (e.g., two to three meters) out along the mobile robotic device's planned direction of travel. Then, the mobile robotic device may carry out the various optimization techniques described herein (e.g., plane-fitting) only for that determined region. In this manner, instead of optimizing for the entire field of view of the distance sensor (or perhaps even for the entire height map), the mobile robotic device may optimize the target spatial orientation of the distance sensor for a determined region of the height map that is relevant to the device's planned trajectory.

In yet another example, the mobile robotic device may determine a target spatial orientation that would allow for maximizing use of the particular distance sensor's capabilities. In particular, different distance sensor may have different respective ranges to which distance measurement may be obtained. For instance, a certain distance sensor may have a respective range of up to ten meters and another distance sensor may have a respective range of up to four meters. In this regard, the mobile robotic device may use the range of the distance sensor (and/or other specific sensor capabilities) as an additional constraint in the optimization, so that the distance sensor can optimally obtain distance measurement up to that range and/or carry out other optimal functions. In practice, assuming other constraints are static, the determined target spatial orientation could thus vary across different distance sensors depending on the respective range of the distance sensor. Other examples are possible as well.

In yet a further aspect, the mobile robotic device may be configured to plan a spatial reorientation of the distance sensor in advance of arriving at a certain location. More specifically, such advance planning may help the mobile robotic device ensure that the spatial orientation of the distance sensor is changed in advance of or at least upon arrival at a certain location, which may help avoid missed and/or false detection resulting from the distance sensor not being at the target spatial orientation upon or immediately after arrival at that certain location. In practice, the mobile robotic device may carry out such advance planning in one of various ways.

For instance, the mobile robotic device may determine an expected location of the mobile robotic device at a future time and may do so relative to the height map. By way of example, the mobile robotic device may have a planned trajectory according to which the mobile robotic device plans to move throughout the environment. In this example, the mobile robotic device may refer to the planned trajectory to determine an expected location at a certain future time. Also, the mobile robotic device may determine the expected location relative to the height map using techniques described above, such as by determining at least one point on the ground surface that corresponds to the expected location.

Further, once the mobile robotic device determines the expected location, the mobile robotic device may then use that expected location as basis for determining an adjusted position of the leveler to which the leveler is movable to cause the distance sensor to spatially reorient to a target spatial orientation relative to the ground surface at the expected location. In this way, the mobile robotic device can use the above-described approach to determine the adjusted position of the leveler that will allow the mobile robotic device to reorient the distance sensor to the target spatial orientation at the future time. In practice, such reorientation may be carried out in advance of arriving at the expected location or upon arriving at the expected location, among other possibilities. For example, the mobile robotic device may determine that the mobile robotic device arrived (or is about to arrive) at the expected location and may responsively cause the distance sensor to reorient to the target spatial orientation by moving the leveler to the previously determined adjusted position. Other examples are also possible.

In yet a further aspect, the above description and figures describe implementation of the present disclosure in the context of reorienting the distance sensor about one axis of control orientation (e.g., one degree of freedom (DOF)). However, it should be understood that the present disclosure may be carried out in the context of reorienting the distance sensor about any feasible number of axes (e.g., two or more DOFs). For example, assuming that yaw is fixed, the mobile robotic device could reorient the distance sensor along pitch and/or roll. Other examples are also possible.

V. Illustrative Scenarios

Figure 7B:
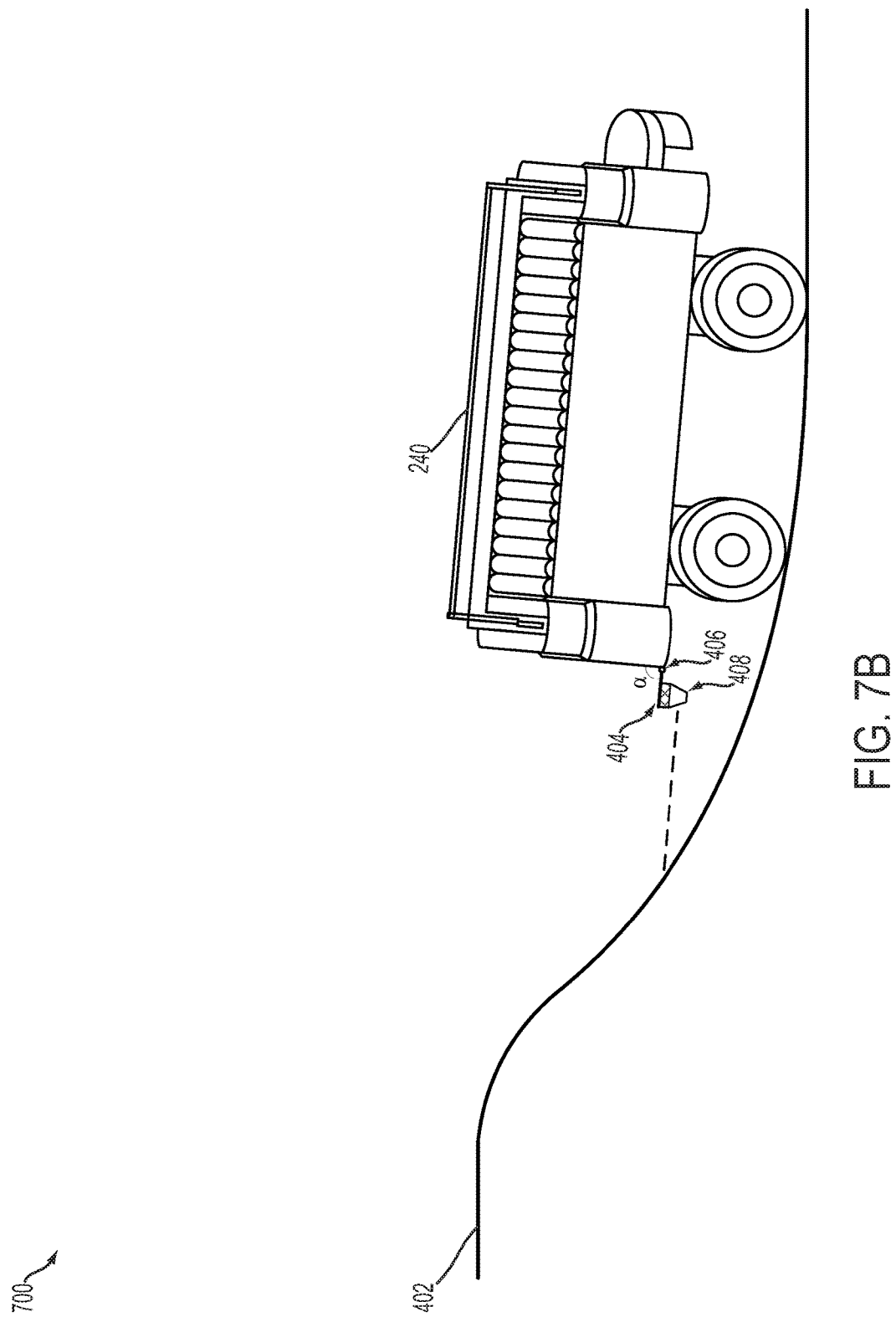
Figure 7C:
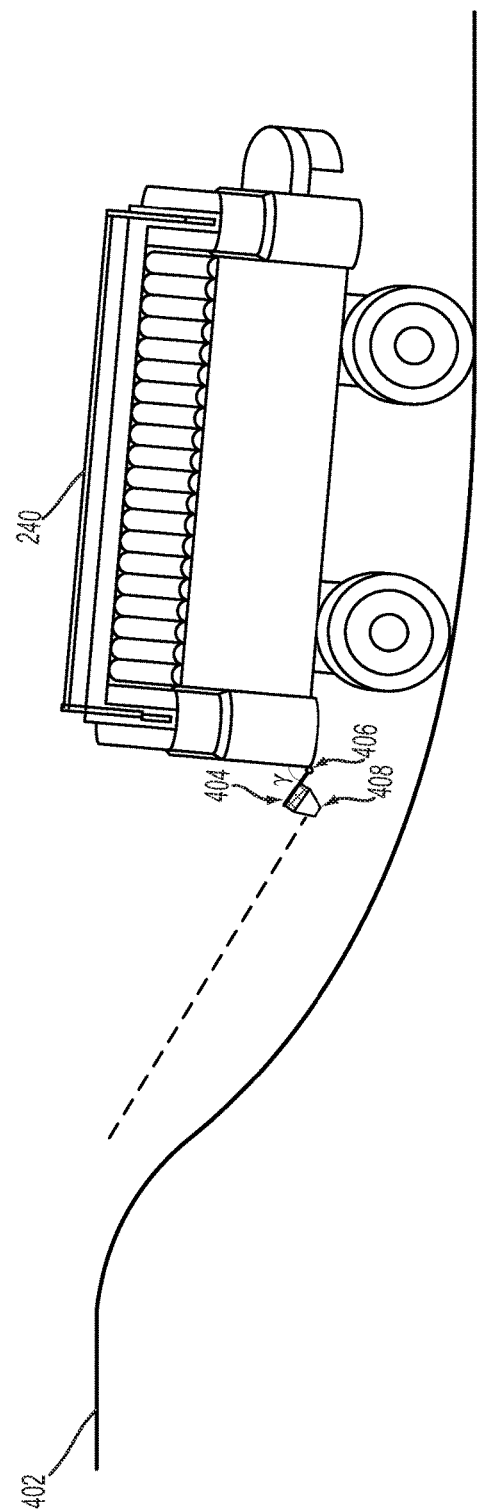

FIGS. 7A to 7C as well as 8A to 8C respectively illustrate example scenarios in which the mobile robotic device may carry out spatial reorientation of the distance sensor in accordance with the present disclosure. Although two such scenarios are described, various other scenarios are possible as well without departing from the scope of the present disclosure.

In one example scenario, FIG. 7A illustrates a current location 700 of the AGV 240 relative to the height map 600. As shown, the AGV 240 is at a location 700 where elevation of the ground surface varies. Moreover, the AGV 240 is traveling in a direction of increasing elevation, which may correspond to a change in curvature of the ground surface.

Next, FIG. 7B is an illustration of the AGV 240 traveling on the ground surface 402 at the current location 700. As shown, the leveling plate 404 is at an angular position α relative to a portion of the AGV 240 and thus that the distance sensor 408 is spatially oriented to emit emissions in a particular direction relative to the AGV 240. However, given the current location 700, the angular position α of the leveling plate 404 may cause the distance sensor 408 to be spatially orientated away from the above-described target spatial orientation relative to the ground surface. Specifically, the current spatial orientation of the distance sensor 408 may result in emissions being reflected from the ground surface 402, which could ultimately lead to false detection of an object.

Further, FIG. 7C is an illustration of the AGV 240 reorienting the distance sensor 408 to the target spatial orientation. As shown, the AGV 240 moved the leveler 404 to an adjusted angular position γ. And in doing so, the AGV 240 reorients the distance sensor 408 to the target spatial orientation while traveling at the current location 700. In this manner, the distance sensor 408 is reoriented to a spatial orientation in which the distance sensor can emit sensor emissions that are substantially parallel to the ground surface and/or receive reflected radiation along a substantially parallel plane relative to the ground surface.

Figure 8A:
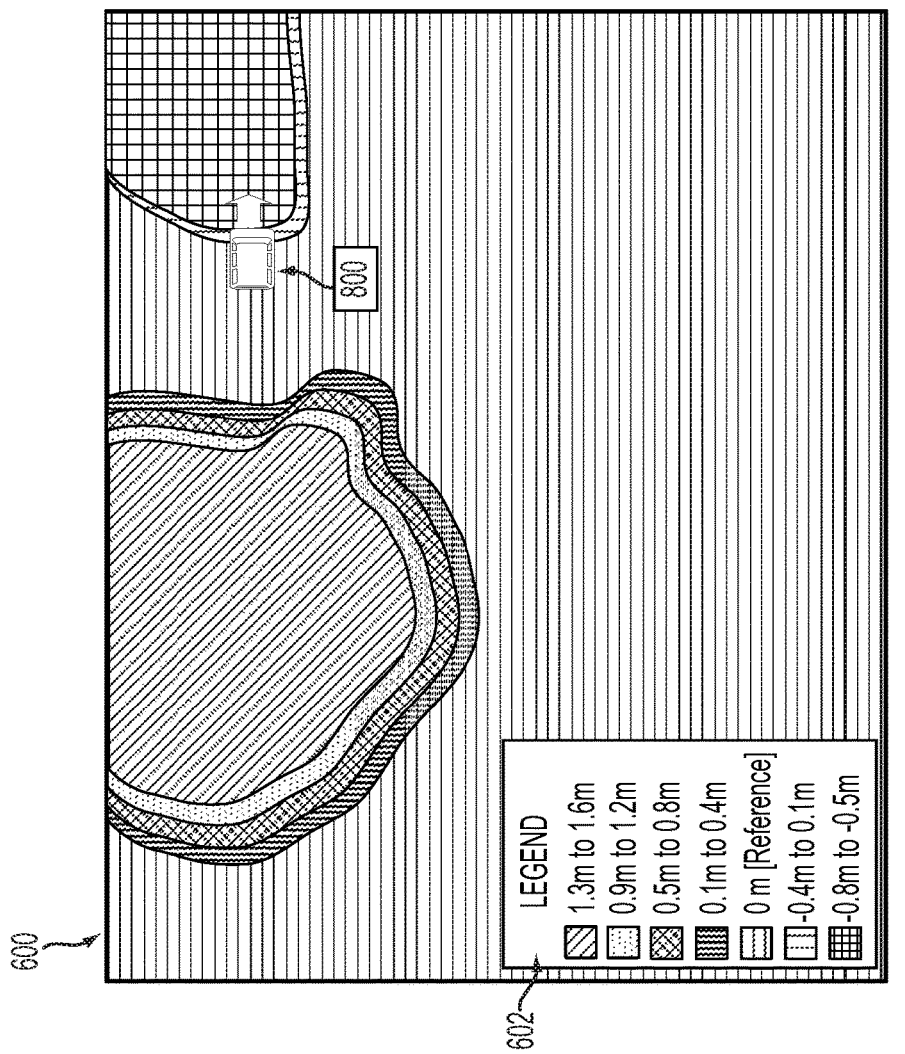

In another example scenario, FIG. 8A illustrates a current location 800 of the AGV 240 relative to the height map 600. As shown, the AGV 240 is at a location 800 where elevation of the ground surface varies. Moreover, the AGV 240 is traveling in a direction of decreasing elevation, which may correspond to another change in curvature of the ground surface.

Next, FIG. 8B is an illustration of the AGV 240 traveling on the ground surface 402 at the current location 800. As shown, the leveling plate 404 is at an angular position α relative to a portion of the AGV 240 and thus that the distance sensor 408 is spatially oriented to emit emissions in a particular direction relative to the AGV 240. However, given the current location 800, the angular position α of the leveling plate 404 may cause the distance sensor 408 to be spatially orientated away from the above-described target spatial orientation relative to the ground surface. Specifically, the current spatial orientation of the distance sensor 408 may result in emissions being emitted significantly away from the ground surface 402, which could ultimately lead to missed detection of an object, such as of object 802 for instance.

Figure 8C:
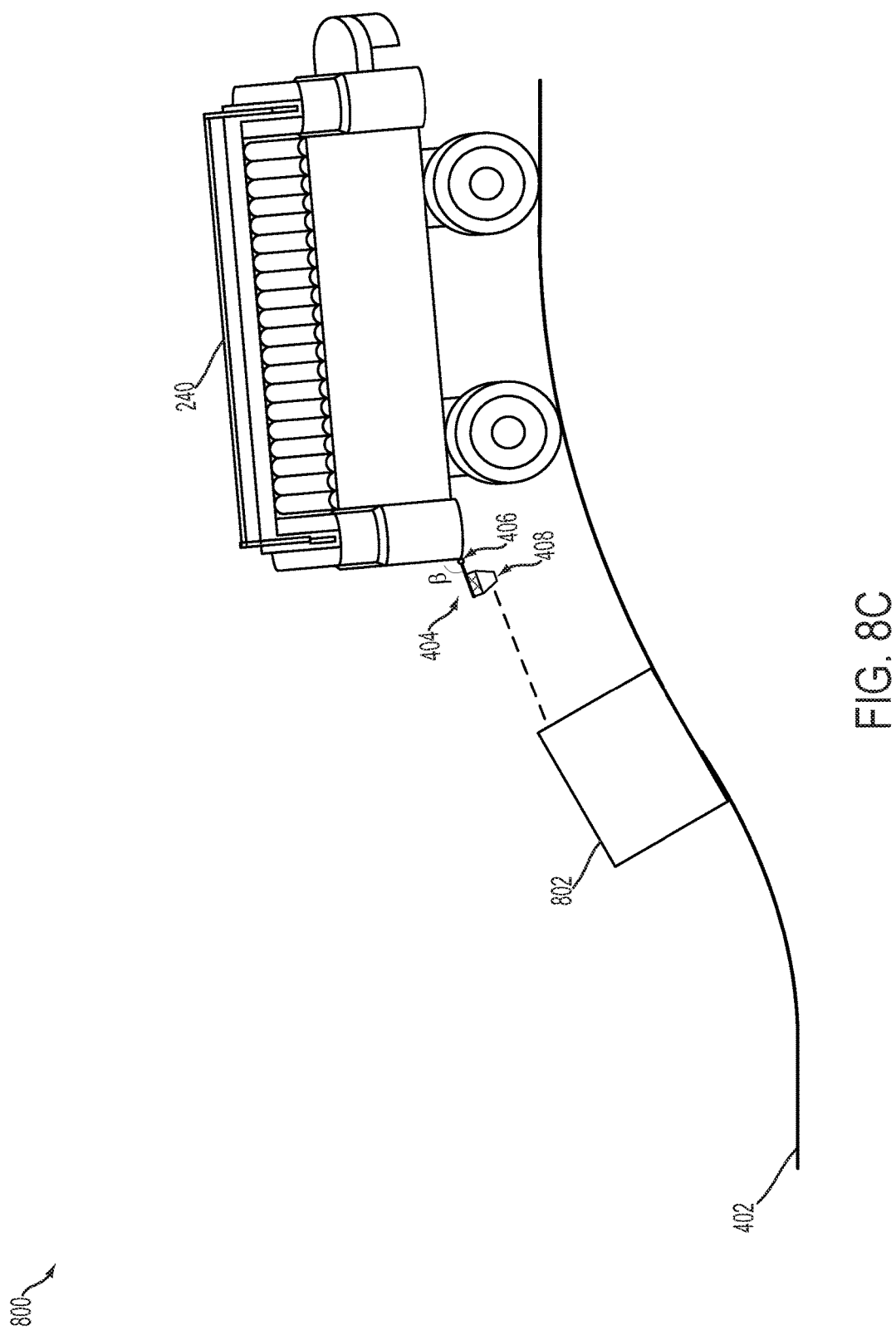

Further, FIG. 8C is an illustration of the AGV 240 reorienting the distance sensor 408 to the target spatial orientation. As shown, the AGV 240 moved the leveler 404 to an adjusted angular position β. And in doing so, the AGV 240 reorients the distance sensor 408 to the target spatial orientation while traveling at the current location 800. In this manner, the distance sensor 408 is reoriented to a spatial orientation in which the distance sensor can emit sensor emissions that are substantially parallel to the ground surface and/or receive reflected radiation along a substantially parallel plane relative to the ground surface. Thus, the AGV 240 could use the distance sensor 408 to detect the object 802.

VI. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method comprising:
   determining, by a mobile robotic device, a height map indicating surface elevation data for a ground surface on which the mobile robotic device is travelling within an environment, wherein the mobile robotic device comprises a distance sensor and a leveler configured to spatially reorient the distance sensor relative to the ground surface;
   determining, by the mobile robotic device, a current location of the mobile robotic device within the environment relative to the height map;
   determining, by the mobile robotic device, a current spatial orientation of the distance sensor relative to the ground surface, based on the determined current location of the mobile robotic device within the environment relative to the height map;
   determining, by the mobile robotic device, an adjustment to position of the leveler that corresponds to a difference between (i) the current spatial orientation and (ii) a target spatial orientation of the distance sensor relative to the ground surface; and
   causing, by the mobile robotic device, the distance sensor to spatially reorient from the current spatial orientation to the target spatial orientation by moving the leveler according to the determined adjustment.

2. The method of claim 1, wherein determining the height map comprises receiving the height map from a control system that is in communication with at least one other sensor located within the environment, and wherein the height map is based on sensor data collected by the at least one other sensor.

3. The method of claim 1, wherein determining the height map comprises:
receiving, from the distance sensor, sensor data indicative of one or more distance measurements each providing a respective distance between the distance sensor and a respective point on the ground surface; and
determining the height map based on the received sensor data.

4. The method of claim 3, wherein receiving the sensor data occurs while the mobile robotic device travels on the ground surface within the environment.

5. The method of claim 3, further comprising:
causing, by the mobile robotic device, the leveler to move through one or more particular positions,
wherein receiving the sensor data occurs while the mobile robotic device causes the leveler to move through the one or more particular positions.

6. The method of claim 5, wherein receiving the sensor data occurs while the mobile robotic device travels on the ground surface along a particular direction of travel, wherein a particular portion of the ground surface corresponds to the particular direction of travel, and wherein receiving the sensor data while the mobile robotic device causes the leveler to move through the one or more particular positions comprises:
while the mobile robotic device causes the leveler to move through the one or more particular positions, receiving sensor data indicative of one or more distance measurements each providing a respective distance between the distance sensor and a respective point within the particular portion of the ground surface.

7. The method of claim 1, further comprising:
after determining the current spatial orientation of the distance sensor relative to the ground surface, the mobile robotic device making a determination, based on the determined current location of the mobile robotic device within the environment relative to the height map, that the current spatial orientation of the distance sensor is different from the target spatial orientation of the distance sensor, and
wherein determining the adjustment to position of the leveler is responsive to making the determination.

8. The method of claim 7, wherein determining that the current spatial orientation of the distance sensor is different from the target spatial orientation of the distance sensor comprises determining that the current spatial orientation of the distance sensor is different from the target spatial orientation of the distance sensor by at least a threshold amount.

9. The method of claim 8, wherein the threshold amount comprises a threshold angular positional difference.

10. The method of claim 1, wherein the leveler is a leveling plate on which the distance sensor is arranged.

11. The method of claim 1, wherein the distance sensor is configured to emit sensor emissions towards objects in the environment, and wherein the target spatial orientation of the distance sensor is a spatial orientation at which the distance sensor is oriented to emit sensor emissions that are substantially parallel to the ground surface.

12. The method of claim 1, wherein the distance sensor is configured to receive radiation reflected from objects in the environment, and wherein the target spatial orientation of the distance sensor is a spatial orientation at which the distance sensor is oriented to receive reflected radiation along a substantially parallel plane relative to the ground surface.

13. The method of claim 1, wherein determining, based on the determined current location of the mobile robotic device within the environment relative to the height map, the current spatial orientation of the distance sensor relative to the ground surface comprises:
selecting at least one point on the ground surface based at least in part on the at least one point corresponding to the determined current location of the mobile robotic device;
based on the height map, determining a current spatial orientation of the leveler relative to the at least one point on the ground surface; and
determining the current spatial orientation of the distance sensor based on the current spatial orientation corresponding to the determined current spatial orientation of the leveler relative to the at least one point on the ground surface.

14. The method of claim 13, further comprising:
determining, by the mobile robotic device, a current position of the leveler relative to a particular portion of the mobile robotic device, and
wherein determining, based on the height map, a current spatial orientation of the leveler relative to the at least one point on the ground surface comprises:
based on the height map, determining a current spatial orientation of the mobile robotic device relative to the at least one point of the ground surface; and
based on (i) the determined current position of the leveler relative to a particular portion of the mobile robotic device and (ii) the determined current spatial orientation of the mobile robotic device relative to the least one point of the ground surface, determining the current spatial orientation of the leveler relative to the least one point of the ground surface.

15. The method of claim 1, wherein determining the adjustment comprises (i) determining a particular change in spatial orientation of the distance sensor that causes the distance sensor to spatially reorient from the current spatial orientation to the target spatial orientation and, (ii) based on the determined particular change in spatial orientation of the distance sensor, determining a particular adjustment to position of the leveler away from a current position of the leveler, the method further comprising:
based on the determined particular adjustment, determining, by the mobile robotic device, an adjusted position of the leveler, and
wherein causing the distance sensor to spatially reorient comprises causing the distance sensor to spatially reorient from the current spatial orientation to the target spatial orientation by moving the leveler from the current position to the determined adjusted position.

16. The method of claim 15, wherein determining the adjusted position of the leveler comprises determining an adjusted angular position of the leveler relative to a particular portion of the mobile robotic device.

17. The method of claim 1, wherein the mobile robotic device comprises an actuator coupled to the leveler, and wherein causing the distance sensor to spatially reorient from the current spatial orientation to the target spatial orientation by moving the leveler according to the determined adjustment comprises:
directing the actuator to provide to the leveler at least one force that causes the leveler to move according to the adjustment.

18. The method of claim 1, further comprising:
determining, by the mobile robotic device, an expected location of the mobile robotic device at a future time within the environment relative to the height map;
determining, by the mobile robotic device, a future spatial orientation of the distance sensor relative to the ground surface, based on the determined expected location;
determining, by the mobile robotic device, a further adjustment to position of the leveler that corresponds to a difference between (i) the future spatial orientation and (ii) a further target spatial orientation at the future time; and
determining, by the mobile robotic device, that the mobile robotic device arrived at the expected location and responsively causing the distance sensor to reorient to the further target spatial orientation by moving the leveler according to the determined further adjustment.

19. A mobile robotic device comprising:
a distance sensor;
a leveler configured to spatially reorient the distance sensor relative to the ground surface;
one or more processors;
a non-transitory computer readable medium; and
program instructions stored on the non-transitory computer readable medium and executable by the one or more processors to:
determine a height map indicating surface elevation data for a ground surface on which the mobile robotic device is travelling within an environment;
determine a current location of the mobile robotic device within the environment relative to the height map;
determine a current spatial orientation of the distance sensor relative to the ground surface, based on the determined current location of the mobile robotic device within the environment relative to the height map;
determine an adjustment to position of the leveler that corresponds to a difference between (i) the current spatial orientation and (ii) a target spatial orientation of the distance sensor relative to the ground surface; and
cause the distance sensor to spatially reorient from the current spatial orientation to the target spatial orientation by moving the leveler according to the determined adjustment.

20. A non-transitory computer readable medium having stored therein instructions executable by one or more processors to cause a mobile robotic device to perform functions comprising:
determining a height map indicating surface elevation data for a ground surface on which the mobile robotic device is travelling within an environment, wherein the mobile robotic device comprises a distance sensor and a leveler configured to spatially reorient the distance sensor relative to the ground surface;
determining a current location of the mobile robotic device within the environment relative to the height map;
determining a current spatial orientation of the distance sensor relative to the ground surface, based on the determined current location of the mobile robotic device within the environment relative to the height map;
determining an adjustment to position of the leveler that corresponds to a difference between (i) the current spatial orientation and (ii) a target spatial orientation of the distance sensor relative to the ground surface; and
causing the distance sensor to spatially reorient from the current spatial orientation to the target spatial orientation by moving the leveler according to the determined adjustment.

* * * * *